(12) United States Patent
Clements

(10) Patent No.: US 9,477,317 B1
(45) Date of Patent: Oct. 25, 2016

(54) SANITARILY OPERATING A MULTIUSER DEVICE USING A TOUCH FREE DISPLAY

(71) Applicant: Sigmund Lindsay Clements, Montreal (CA)

(72) Inventor: Sigmund Lindsay Clements, Montreal (CA)

( * ) Notice: Subject to any disclaimer, the term of this patent is extended or adjusted under 35 U.S.C. 154(b) by 386 days.

(21) Appl. No.: 14/258,013

(22) Filed: Apr. 22, 2014

(51) Int. Cl.
*G06F 3/0481* (2013.01)
*G06F 3/01* (2006.01)
*G06F 3/16* (2006.01)
*G06F 3/0484* (2013.01)

(52) U.S. Cl.
CPC ............... *G06F 3/017* (2013.01); *G06F 3/013* (2013.01); *G06F 3/04817* (2013.01); *G06F 3/04842* (2013.01); *G06F 3/167* (2013.01)

(58) Field of Classification Search
CPC ........................................................ G06F 3/017
USPC .......................................................... 715/728
See application file for complete search history.

(56) References Cited

U.S. PATENT DOCUMENTS

| | | | | | |
|---|---|---|---|---|---|
| 2,033,187 | A | * | 3/1936 | Dolan | B65D 3/10 229/5.5 |
| 2,595,067 | A | * | 4/1952 | Flint | G01H 1/00 310/25 |
| 4,946,271 | A | * | 8/1990 | Pålsgård | G06F 3/013 351/209 |
| 5,201,080 | A | * | 4/1993 | Tanaka | E03D 9/08 4/443 |
| 5,307,524 | A | * | 5/1994 | Veal | E03D 5/10 4/246.1 |
| 5,828,044 | A | * | 10/1998 | Jun | G06K 7/0008 235/380 |
| 6,317,717 | B1 | * | 11/2001 | Lindsey | E03C 1/055 137/559 |
| 7,274,290 | B2 | * | 9/2007 | Morita | G06F 19/3406 340/539.1 |
| 7,483,964 | B1 | * | 1/2009 | Jackson | H04L 12/2809 455/41.1 |

(Continued)

FOREIGN PATENT DOCUMENTS

| | | |
|---|---|---|
| CA | 2772957 A1 | 9/2013 |
| CA | 2776856 A1 | 11/2013 |
| CA | 2778201 A1 | 11/2013 |

OTHER PUBLICATIONS

U.S. Appl. No. 14/312,697, Sigmund Clements.

(Continued)

*Primary Examiner* — Reza Nabi

(57) ABSTRACT

A touch free input display control panel, may be used, to hygienically operate a device. Touch free input, allows the user, to activate the device's functions, which are displayed on the display, without physically touching the display. Limiting contact with the display, limits the possible transference of harmful bacteria and viruses, from the control panel to the users fingers. Limiting bacterial transmission between the user, and the panel, may be beneficial for users of multiuser public input displays, where contamination from bacteria on the displays is possible. Touch free displays may be used with the operation of devices, such as, elevators, as the elevator control panel. Touch free input may reduce static electric discharge, which may be beneficial in flammable environments, by reducing the possibility of flammable material combustion. Reducing static electric discharge may be beneficial in dry environments, such as, in a space station.

8 Claims, 22 Drawing Sheets

(56) References Cited

U.S. PATENT DOCUMENTS

| | | | | |
|---|---|---|---|---|
| 7,636,956 B1* | 12/2009 | Doucet | A47K 13/10 | 4/246.1 |
| 7,917,973 B2* | 4/2011 | Baumoel | A47K 13/10 | 4/246.1 |
| 8,020,221 B2* | 9/2011 | Borochov | A47K 13/10 | 220/262 |
| 8,064,647 B2* | 11/2011 | Bazakos | G06K 9/00261 | 382/117 |
| 8,272,077 B2* | 9/2012 | Hashimoto | E03D 9/08 | 4/420.4 |
| 8,452,131 B2* | 5/2013 | Connell, II | G06K 9/00617 | 382/305 |
| 9,251,104 B2* | 2/2016 | Cudak | G10L 15/08 | |
| 2002/0007510 A1* | 1/2002 | Mann | E03C 1/057 | 4/300 |
| 2009/0174662 A1* | 7/2009 | Kato | G06F 3/03543 | 345/163 |
| 2010/0141397 A1* | 6/2010 | Kim | G08B 21/0423 | 340/10.5 |
| 2012/0113223 A1* | 5/2012 | Hilliges | G06F 3/00 | 348/46 |
| 2012/0234409 A1* | 9/2012 | Klicpera | B05B 12/004 | 137/551 |
| 2013/0180041 A1* | 7/2013 | Ding | E03D 9/085 | 4/447 |
| 2014/0111479 A1* | 4/2014 | Krah | G06F 3/0421 | 345/175 |
| 2015/0000025 A1* | 1/2015 | Clements | G06F 3/013 | 4/443 |
| 2015/0000026 A1* | 1/2015 | Clements | G06F 3/013 | 4/443 |
| 2015/0167280 A1* | 6/2015 | Le | E03C 1/057 | 251/129.04 |

OTHER PUBLICATIONS

U.S. Appl. No. 14/512,359, Sigmund Clements.
U.S. Appl. No. 14/556,144, Sigmund Clements.
U.S. Appl. No. 14/585,187, Sigmund Clements.
U.S. Appl. No. 14/634,788, Sigmund Clements.
U.S. Appl. No. 14/791,895, Sigmund Clements.
Chandra Steele, 9 Devices That Need Apple Homekit, Jun. 4, 2014, p. 1, PC Magazine, New York, New York, USA.
Editor, Samsung Galaxy S4 Review article, sub article Eye tracking and gestures, Mar. 23, 2013, pp. 1-2, CNETweb site, CBS Interactive, San Francisco, California, USA.
Anonymous Author, Sony Xperia sola article, sub article Floating Touch, no date of publication,, pp. 1-2, Wikipedia web site, San Francisco, California, USA.
Jason Gilbert, Satis Bluetooth Toilet: Japan's Lixil Creates a Commode That Can Be Totally Controlled Via Smartphone, Huffington Post web site, Dec. 18, 2012, New York, New York, USA.
Anonymous Author, Intel Audience Impression Metric Suite, sub article Empowering digital signage with audience detection and analytics, no date of publication, pp. 1-2, Intel Audience Impression Metric Suite web site, Intel corporation, Santa Clara, California, USA.
Steven Levy, Brave New Thermostat: How the iPod's Creator Is Making Home Heating Sexy, Oct. 25, 2011, Wired Magazine, New York, New, New York, USA.
Dan Graziano, Use the Xbox One and Kinect sensor as a universal remote, Oct. 25, 2013,CNET web site, San Francisco, California, USA.

* cited by examiner

SANITARILY OPERATING A MULTIUSER DEVICE USING A TOUCH FREE DISPLAY

CROSS REFERENCE TO RELATED APPLICATIONS

This application claims the benefit of provisional patent applications, Ser. Nos. 61/954,567 filed 2014 Mar. 17, 61/946,789 filed 2014 Mar. 1, 61/922,755 filed 2013 Dec. 31, 61/916,298 filed 2013 Dec. 16, 61/912,024 filed 2013 Dec. 5, 61/910,299 2013 Nov. 30, 61/896,117 filed 2013 Oct. 27, 61/890,186 filed 2013 Oct. 12, 61/889,167 2013 Oct. 10. This application claims the benefit of patent applications, Ser. No. 13/928,378 filed 2013 Jun. 27, Ser. No. 13/927,111, filed 2013 June 26, by the present applicant.

SEQUENCE LISTING

None

BACK GROUND FIELD OF THE EMBODIMENT

This description relates to touch screen displays, and touch control panels, used to operate a device or devices, specifically an improved ways to hygienically input data using the display, to improved ease of use of the display, and to improved user feedback from the display, when the user interacts with the display.

BACK GROUND OF THE EMBODIMENTS

There are various ways to input data into a device, and or operate the device, without having to touch surfaces which possibly may have bacterial on them. Medical input devices, such as, multi user x-ray machines, may use a temporary plastic film that can be removed and replaced after a new user touches the device. Antibacterial hand lotion dispensers have become more common, place in public places, in an effort to reduce the transmission of harmful bacteria, and viruses, between users, and surfaces that users touch. People where rubble gloves to reduce the transmission of germs.

Touch free displays have been used to operate devices, though not to operate devices touch freely for sanitarily reasons. When displays have been used in the touch free operation of devices, they have been used for reasons other than hygienic reasons.

Touch free hygienic displays have been limited to the touch free operation of the displays. For example, Mark M. Morita, Steven Fors, Khal Rai, in U.S. Pat. No. 7,274,290 B2, (2007) uses a hygienic touch free input, to access data patient to be displayed on an operating room display. The touch free input operates the display, but doesn't operate an additional device.

Infrared hand sensors are used to operate sink water faucets, toilet flushers, hand dryers, and door openers. Motion sensing is used to open doors. The motion sensing is used, so users don't have to touch surfaces that may contain germs, or to stop the user from leaving germs on the surface, which the next user may contact and contaminate themselves with. Several types of hands free devices, such as, toilet seat rising and lowering devices, have been proposed, for example, Baumoel in, U.S. Pat. No. 7,917,973 (2011) shows an infrared hands free system, for lifting and lowering a toilet seat.

Several Satis toilets made by the Lixil Corporation of Tokyo, Japan, use a smart phone Bluetooth connection to a Satis smart toilet, to activate the various toilet's devices. The Satis uses the smart phone, to operate the smart toilet, but the smart phone is limited to operating the toilet, and is not used for the operation of other devices, such a, elevators.

Fuhuan Chen's Intelligent Toilet Seat with Voice Control System, bibliographical data Cn201202168 (Y)—2009 Mar. 4, application number (CN) (y) 6 CN20082370552U uses voice recognition to control a smart toilet. Though there is no user toilet control panel display, for the user to interact with the smart toilet. Kenneth R. Lindsey, Cynthia Kaelin, Christopher A. Cooper, Voice activated liquid management system U.S. Pat. No. 6,317,717 B1, publication date 13 Nov. 2001 use's voice recognition to control the water flow of toilet devices such, faucet, shower, toilet flush, etc.

Some devices use touch free input, though the touch free input isn't used for bacterial avoidance. The Xperia sola from Sony includes Floating touch technology. Air Gestures: Refers to hand movements made above the phone's display, without coming into contact with the display that controls the phone. Common gestures include waving your hand over the display to skip a track or waving left and right to switch between open web pages in the browser. Eye-tracking uses the camera to lock onto the motion of the eyes, following wherever they move. With it, the phone can perceive where the user is looking, and can respond to a set of behaviors; let's say a very intentional movement to scroll a web page up and down, or a long, purposeful blink to click. The user can also answer the phone or skip a track just by waving your hand over the screen. Air View allows the user to hover their finger over certain items on the phone to get a preview. Smart Pause" tracks a user's face and stops any video you're watching if you look away. The Samsung Galaxy 4 smart phone uses a touch free capacitive field to allow a user to interact with the phone while hovering above the display screen.

A Kinect sensor made by the Microsoft Company interprets user's body and hand gestures in mid-air to operate a computer game. Intel's gesture recognitions creative interactive camera perceptual computing software allows. Two dimensional and three dimensional cameras and sensors, connected to computers, can be used for the mid-air, free air inputting of data. Intel Creative Camera and Perceptual Computing software can also be used for three dimensional (3D) imagining, of the user's hand. Other three dimensional cameras could be used, such as, Kinect technology camera sensor made by the PrimeSense company, a Cambord Pico camera made by the Optoma company of Watford, United Kingdom.

Apple Company uses voice recognition called Siri for touch free verbal interaction with the iPhone smart phone. The Xbox connected to the Xbox Kinect made by the Microsoft Corporation of Redmond, Wash., uses skeletal mapping of a user, to interact touch freely with avatars on a television screen. The Tobii Corporation of Danderyd, Sweden uses eye tracking software and hardware to allow a user to touch freely control the interaction of a computer display. The Leap motion company of San Francisco, Calif. uses three dimensional (3D) mid-air user hand detection, interaction with displayed virtual input data.

Three dimensional sensors could be used for touch free input, such as, a Leap Motion controller sensor, a Kinect technology camera sensor, a Elliptic labs ultrasonic sensor, a nano camera using light reflection from MIT school, to determine the location of a user's finger, and Samsung's Galaxy S4 infrared sensor, a Flutter gesture recognition system, a technology, called Chirp, which is made by the Chirp company, Microsystems Haptix gesture recognition chip, a Infineon 3D Image Sensor, A XTR3D Cameras and, Samsung's Galaxy S4 infrared sensor, etc. STMicro electronic company uses a floating capacitive touch field, above the display screen, to act as a mid-air touch capacitive input data field.

Other touch free devices allow a user touch free input, such as, Eyesight Company's eye gesture recognition technology allowing eye movement to input, interact with a display. Further examples include, floating capacitive touch screen, mid-air touch display voice recognition, eye tracking, gesture recognition, control displayed avatar, mid-air touch, brain wave activation. Touch free displays have been limited in their use as hygienic input displays used to operate a device.

Control panel device function activation buttons can become contaminated by germs, during user hand contact with the control buttons. The bacteria can be transmitted from the panel buttons, to a person's hands. Bacteria and viruses on the hands, may spread the to the person's mouth, to other surfaces, to other people, and to food. The spread of bacteria, increases the risk of food poisoning, and transmission of diseases.

Many people don't like to touch buttons, that have bacteria on them, such as, public control touch buttons, and touch display faces have the problem of accumulating germs. Some people try to wrap paper around their hand, before touching the control panel buttons, in an effort to try to put an antibacterial barrier between the buttons and their hand. The paper barrier is ineffective, since bacteria can easily travel through paper. People may try to use a piece of clothing, such as a part of a shirt sleeve as a barrier between the button and the hand. The shirt sleeve may act as a barrier; thought bacteria can attach to the user's shirt sleeve. Disposable rubber gloves may be effective in using the buttons sanitarily, though it may be inconvenient to carry and use rubber gloves.

DISADVANTAGES

Many of the touch displays, heretofore known suffer from a number of disadvantages, such as, bacteria maybe transmitted to a user's finger when touching the display. Touch free displays, have been had limited use, to reduce bacterial transmission.

Many of the touch operating panels heretofore known suffer from a number of disadvantages:

a) Bacteria and viruses can be transmitted to a user who touches, a multiuser touch screen display or touches control panel buttons.

b) A Static electric discharge may happen as a user touches the screen, which maybe be hazardous in flammable environments.

c) A Static electric discharge may happen as a user touches the screen, which may be hazardous in dry environments, such as, on a space station.

d) It may be difficult for the user to access the area where are control panel is located, to touch the panels buttons.

e) Physically challenged users may have difficulty, touching the control panel buttons.

f) It may be difficult to clean and remove bacteria from mechanical buttons, the buttons may be difficult to clean, which may allow bacteria to build up on the buttons.

g) Touch free displays don't give active feedback to a user concerning how close-their fingers are to touching the display screen surface. The user needs to visually judge, of how far the distance of their fingers, are from the screen, to avoid touching the screen. A user judging screen distance, may use mental and physical effort, to avoid a user's fingers contacting the screen.

SUMMARY

In accordance with various embodiments of touch free displays used to operate devices, allows a user to operate a device hygienically. Touch free interaction reduces or eliminates the transference of bacteria from the panel to the user's hands. Touch free displays, can be used to operate a device, and to enable the user to touch freely input, using the display to operate the device. The reduction of transferred bacteria to the hands may increase the health and wellbeing of the user.

The touch free display can be used to limit static electric discharge. The touch free display can be used to limit the transference of dirt to user's fingers from a control panel. Touch free display can be used for dirt avoidance. Touch free displays can be used as gas self-serve gas pump displays, to limit the transference of petroleum product to a user's hands.

Displayed data, such as text, symbols, and icons are used as input-buttons. The input buttons can be associated with a plurality of a devices operations, such as, operating an elevator or lift, to go to a specific floor, etc. A variety of devices can use touch free displays, for example, space station devices, vending machine, medical devices, etc.

The touch free displays can use a variety of devices to allow touch free user interaction and input to operate a device, the touch free display devices can be used individually or in combinations with each other to allow touch free input.

A midair touch display can use displays, such as, a Displair, Heliodisplay, or Leia mid-air display, which uses projections on midair water droplets, which allow the user to input touch midair projected data, to operate a device. A floating capacitive field such as one made by STMicroelectronics display allows a user, to midair touch above a display face, to activate displayed data, to operate a device. Midair hand and finger gesture recognition sensors or cameras, with operating software, such as, a leap sensor, a Elliptic Labs ultrasonic sensor, an Intel technology camera, an eyesight system, point grab gesture system, EyeSight Mobile Technologies, Pico cambord camera, allow a user's finger in mid-air, to control an avatar, and active displayed data, in a 2 dimensional or 3 dimensional space, to operate a device, The gesture recognition systems, interprets a user's midair hand gestures, too active displayed data.

Tobii Eye Tracking Company and Point grab, uses eye tracking to touch freely activate displayed device operation icons the user looks at icon they wants to activate and the icon is a user can move an avatar on a display to activate displayed data, using Evolve company technology, and a Kinect sensor. Voice recognition, such as, Apple's Siri, Microsoft voice recognition, Nuance voice recognition, can be use voice recognition to activate displayed icons. A Neurosky, Mindwave, Emotiv brain wave and thought monitoring headset uses a brainwave sensing headset to activate displayed data icons. A laser interactive touch input display can be projected on to a user's hands. An interactive touch input display can be projected on to a user's hands, using data icons. A laser interactive touch input display can be projected on to a user's hands. An interactive touch input display can be projected on to a user's hands, using technology from UBI Interactive Company. AllSee, uses existing radio signals as both a power source and the means for detecting a user's mid-air hand gesture command.

Many multi user devices and public user devices can benefit from a connection, to touch free displays. Devices incorporating to touch free displays may include, an elevator control panel, and a display used as automated teller.

To inform and alerted a user to their fingers distance to the display face to allow the user to avoid contact with the screen, a variety of devices can be used. Devices, using sensory output clues such as, mid-air touch, visual clues, or sound, can be used separately or individually to alert a user. Ultrasonic transducers can create a field above a display face that can be felt by the user. The field allows the user to avoid contact with the screen, and receive mid-air touch feedback, of interaction with displayed device activation icons. Sound signals can be used to alert to their position to display face that can be felt by the user to allow the user to avoid contact with the screen. Visual signals on the display can be used to alert to their position to display face that can be felt by the user.

The display can be a touch screen liquid crystal, or input button, or mid-air touch display, or data and icons printed on a placard, which a user midair touches perpendicularly to the displayed data.

Advantages

Accordingly several advantages are to provide an improved finger touch free control panel, as a means of providing a more sanitary, fun, and healthy experience, for a user. Still further advantages will become apparent from a study of the following description and the accompanying drawings. Various embodiments of touch free control panels, allow a user to control the various devices without touching the control panel display. The capabilities and functions of the touch free control panel, bring the future of sanitary practices and advances, to the present now.

Some advantages of touch free user device activation, are bacteria and viruses, are unable to be transmitted to the user's hands, from the control panel. By limiting hand contact, with the bacteria and viruses that are on the panel, the transmission of bacteria and viruses to the hands and fingers, is substantially reduced. Lowering the amount of bacteria on a user's fingers, lowers the amount of bacteria transmitted from the fingers to the user's month, by hand to mouth transmission.

By lowering the quantity of bacteria on the user's hands, the amount of bacteria traveling from the hands to food is lowered. Lowering the cross contamination of bacteria and viruses, from the control panel to the user's hands, lessens peoples exposure to food poisoning, and disease pathogens.

Service sectors that are highly concerned about hygiene, such as the food industry, restaurants, medical industry, hospitals, health workers, may be interested in hands free control panels. For example, combining hands free toilet seats, with washlet bidets that use water to clean a user's bottom, and a warm air dryer to dry the user's bottom, greatly reduces the need for a user to use toilet paper, which may reduce the amount of bacteria, the user to may be in contact with.

Progress in control panel cleanliness increases people's psychical wellbeing, and mental wellbeing, by having a safer bacteria. Touch free display devices may be advantages for work place environments. Work places may include food processing plants, restaurants using mid-air displays to operate smart toilets, Hospitals may reduce the spread of anti-biotic resistant super bacteria, using mid-air displays to operate hospital devices, such as, hospital elevators, etc.

Touch free displays maybe used in flammable environments to avoid static electric discharges, which may ignite flammable material, such as, in a bio gas plant. Mid-air displays maybe used in other space, space stations, where static electricity may be a problem, caused by the dry air environment.

Advantages

Some advantages of touch free displays used to operate devices include the following advantages.

a) Bacteria and viruses transmitted to a user's hands may be lessened, by the user not needing to touch display buttons, buttons which may have bacteria and viruses on them.

b) The transducer arrays connected to a computer can give a user differing haptic mid a touch feeling for each mid-air displayed icon or text, while the users is using mid-air gesture recognition to id air input data.

c) Users don't have to worry about what a person, had on their fingers, who touched the display before them, since touching the display is reduced.

d) Devices can be used to inform a user of their fingers distance from the display's screen, such as, mid-air touch generated by ultrasonic transducers, visual information displayed on the display, audio alerts from a speaker. The feedback saves a user judging the screen distance, which may save the user mental and physical effort, used to avoid their fingers contacting the screen.

e) The chance of a static electric discharge may be decreased, since a user doesn't touch the screen, which reduces the chance of static electric discharge, which maybe be beneficial in hazardous flammable environments, and dry outer space station environments.

f) The non-touch panel may aid disabled users by allowing users to active icons with objects, without needing to contact an input button.

g) The non-touch panel allows for easy interaction with the control panel, for medically, mobility challenged users h) The touch free user input systems may be more versatile, user friendly, simpler and easier to use, then other systems, they only needs non touch user input to operate.

i) It may be fun and enjoyable to interact with touch free systems. This touch free interact action, may lead to a positive bonding between the user and the apparatus.

j) Touch free displays may be beneficial when operating public multiuser devices, where differing pathogens maybe transmitted.

k) Touch free displays used, with anti-bacterial hand lotions may reduce bacteria transmission, even more than using the lotion by its self.

l) Touch free displays may decrease sickness caused by bacterial contamination. Decreasing sickness may increases productivity, and work space contentment.

m) There are many ways to touch freely interact with a touch free display control panel, for example using, voice recognition, fingers hovering above the display in a capacitive field, eye tracking, etc., or a combination of the different touch free devices used together.

n) Touch free panels, can be used to control devices, such as, an elevator, medical devices, such as blood pressure monitors, a library keyboard, a smart toilet, space station devices, such as space station toilets, automated tellers, Skype pay phones, devices operated in flammable environments, and a music player, etc.

o) The display can also connected to the internet, Skype video pay phones can use the display, advertising can be displayed, people can leave written messages and video with sound massages, on the display.

Accordingly several advantages are to provide an improved hygienic hands free display screen, to operate a device, as a means of providing a more sanitary, fun, and healthy experience, for a person. Still further advantages will become apparent, from a study of the following description, and the accompanying drawings. Various embodiments of hands free display screen operated devices, allow a user to interact the display, without touching the display assembly. The capabilities and functions of the hands free device, bring the future, of sanitary practices and advances, to the present now.

DRAWINGS

Figures

DRAWINGS REFERENCE NUMERALS

Figure 1:
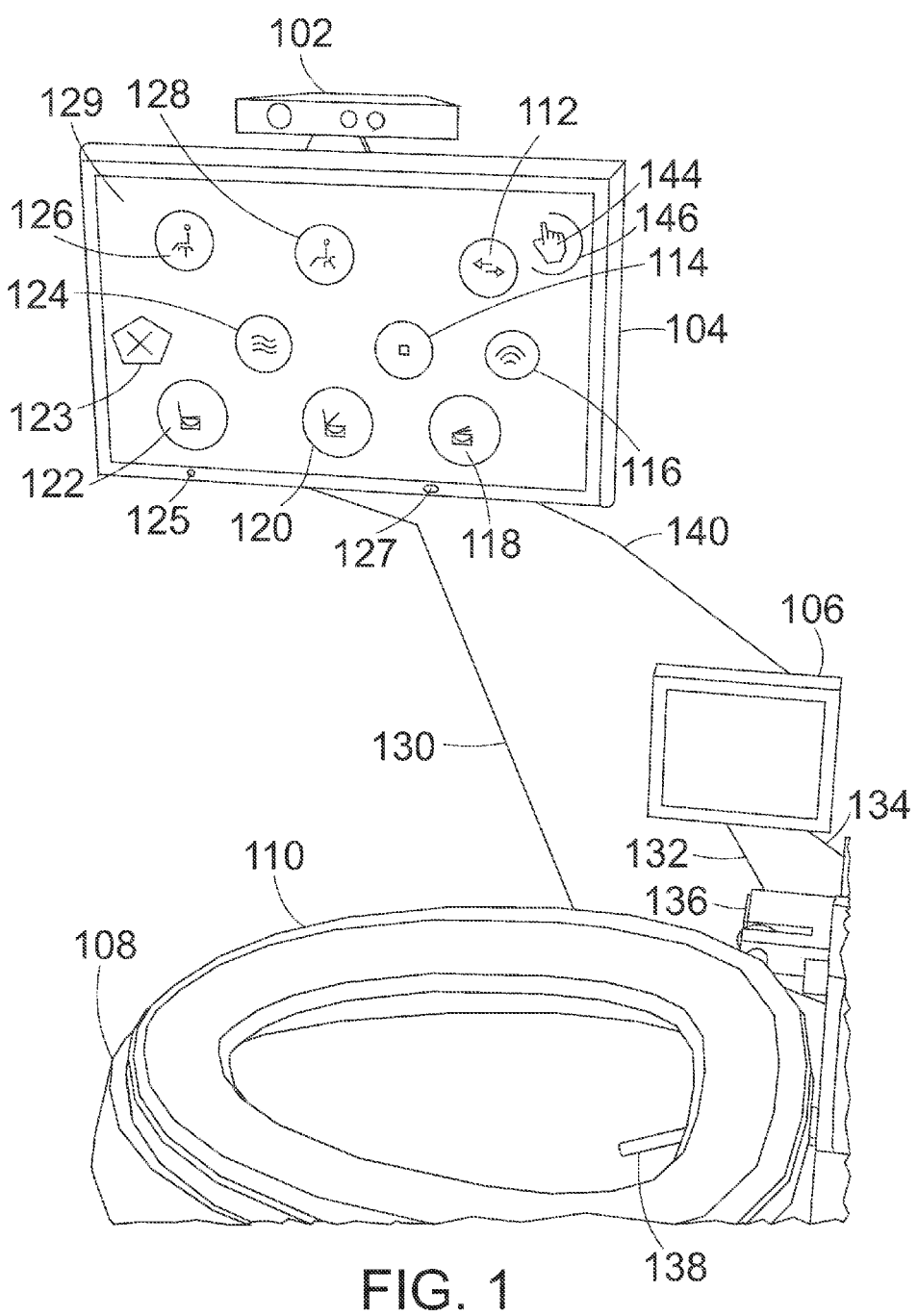
FIG. 1 shows a perspective view of a touch free input mid-air hand gesture controlled avatar toilet control panel.

102 Kinect sensor avatar
104 LCD display avatar
106 Sony all in one computer avatar
108 smart toilet avatar
110 toilet seat avatar
112 bidet wand mover avatar
114 stop button avatar
116 internet connection avatar
118 seat and lid closed avatar
120 seat and lid up position avatar
122 lid up avatar
123 profile activation icon avatar
124 air dryer bottom avatar
125 microphone avatar
126 front wash avatar
127 speaker avatar
128 back wash avatar
129 display face avatar
130 display wire alternating current avatar
132 computer connection to toilet motor controller avatar
134 Sony computer wire alternating current avatar
136 toilet motor avatar
138 bidet manual and automatic avatar
140 display to computer wire connection avatar
142 wall avatar
144 user controlled hand avatar cursor avatar
146 avatar hand visual activation timer avatar
150 lid avatar
152 user interaction zone avatar
154 toilet alternating current wire connection avatar
156 lid motor avatar
302 display mid-air capacitive
304 input able icon mid-air capacitive
306 mid-air gesture recognition sensor or camera mid-air
308 eye tracking sensor mid-air capacitive
310 projector for projecting display on users hand mid-air
312 speaker mid-air capacitive
314 microphone mid-air capacitive
316 floating capacitive filed mid-air capacitive
318 transducer mid-air capacitive
320 mid-air haptic touch mid-air capacitive
322 users hand mid-air capacitive
324 avatar synchronization mid-air capacitive
326 avatar mid-air capacitive
328 vending machine mid-air capacitive
402 mid-air touch display mid-air display
404 input able icon mid-air display
406 mid-air gesture recognition sensor or camera mid-air display
408 eye tracking sensor mid-air display
412 speaker mid-air display
414 microphone mid-air display
426 avatar mid-air display
428 elevator mid-air display
430 projector mid-air display
502 illuminated browser gesture
504 move eye up or down icon gesture
506 increase or decrease bidet water spray pressure icon
508 The user activates the stop button gesture
510 hand in a first with thumb sticking out icon gesture
512 toilet seat warmer gesture
514 tongue icon gesture
516 illuminated scroll lettering gesture
518 smiley face up icon gesture
520 bottom air dryer icon gesture
522 following the first with thumb down icon gesture
524 lid down icon gesture
525 two fingers pointed out horizontally icon gesture
526 first with thumb up icon gesture 527 seat up icon gesture
528 lid up icon gesture
530 one finger up icon gesture
532 hand back and forth movement icon gesture
534 seat following icon gesture
536 front wash bidet icon gesture
538 back wash bidet icon gesture
540 two finger up icon gesture
541 user back gesture gesture
542 internet activation icon gesture
543 user front gesture gesture
544 thumb and index finger making a circle hand sign icon gesture
548 camera gesture
550 display gesture
552 computer gesture
554 user gesture interaction zone gesture
556 microphone gesture
558 speaker gesture
560 user eye interaction zone gesture
562 bidet gesture
564 lid gesture
566 toilet gesture
570 seat gesture
572 user gesture
702 midair gesture display medical device
708 eye tracking sensor medical device
728 medical device medical device
802 mid-air display store payment device
814 voice recognition microphone store payment device
828 store payment device store payment device
902 display store payment device
906 mid-air gesture sensor store payment device
928 space station device store payment device
1002 flammable environment mid-air display flammable environment
1014 microphone flammable environment device
1028 flammable environment device flammable environment device
1102 automated teller display ATM
1106 gesture recognition sensor ATM
1128 automated teller ATM ATM
1232 elevator, portable computer
1234 smart toilet, portable computer
1236 store payment checkout machine, portable computer
1410 radio wave connection portable glasses
1412 smart glasses portable glasses
1414 brainwave for controlling eye glass display portable glasses
1416 user portable glasses
1432 elevator connectable to glasses portable glasses
1434 smart toilet connectable to glasses portable glasses
1436 user medical connectable to glasses portable glasses
1502 avatar and touch input display,
1504 avatar and touch input display device,
1506 display icon 1508 vending machine,
1510 blue tooth radio waves,
1512 smart phone display,
1514 display icon,
1516 smart phone,
1518 smart watch display,
1520 display icon,
1524 smart watch,
1526 smart glasses display,
1528 display icon,
1530 smart glasses
1602 mid-air gesture display projected display
1603 projected display projected display
1604 icon projected display
1610 projector projected display
1622 hand projected display
1628 gas pump projected display
1702 Hewlet Packard all in one computer voice and eye recognition
1704 display voice and eye recognition
1706 speaker voice and eye recognition
1708 microphone voice and eye recognition
1710 stop button voice and eye recognition
1712 gaze point voice and eye recognition
1714 interactive hearing pathway voice and eye recognition
1716 interactive vocal pathway voice and eye recognition
1718 user voice and eye recognition
1720 Satis smart toilet voice and eye recognition
1724 back wash voice and eye recognition
1726 Tobii sensors voice and eye recognition
1728 verbal speaking pathway voice and eye recognition
2202 mid-air gesture recognition camera keyboard
2208 ultrasonic transducers keyboard
2214 display keyboard
2236 icon keyboard
2302 ultra-sonic mid-air gesture recognition sensor keyboard
2306 activation zone keyboard
2308 ultrasonic transducers keyboard
2314 icon keyboard keyboard
2316 mid-air haptic field feedback sign keyboard
2318 activation zone sign keyboard
2322 mid-air haptic field zone keyboard

DETAILED DESCRIPTION

Figure 2:
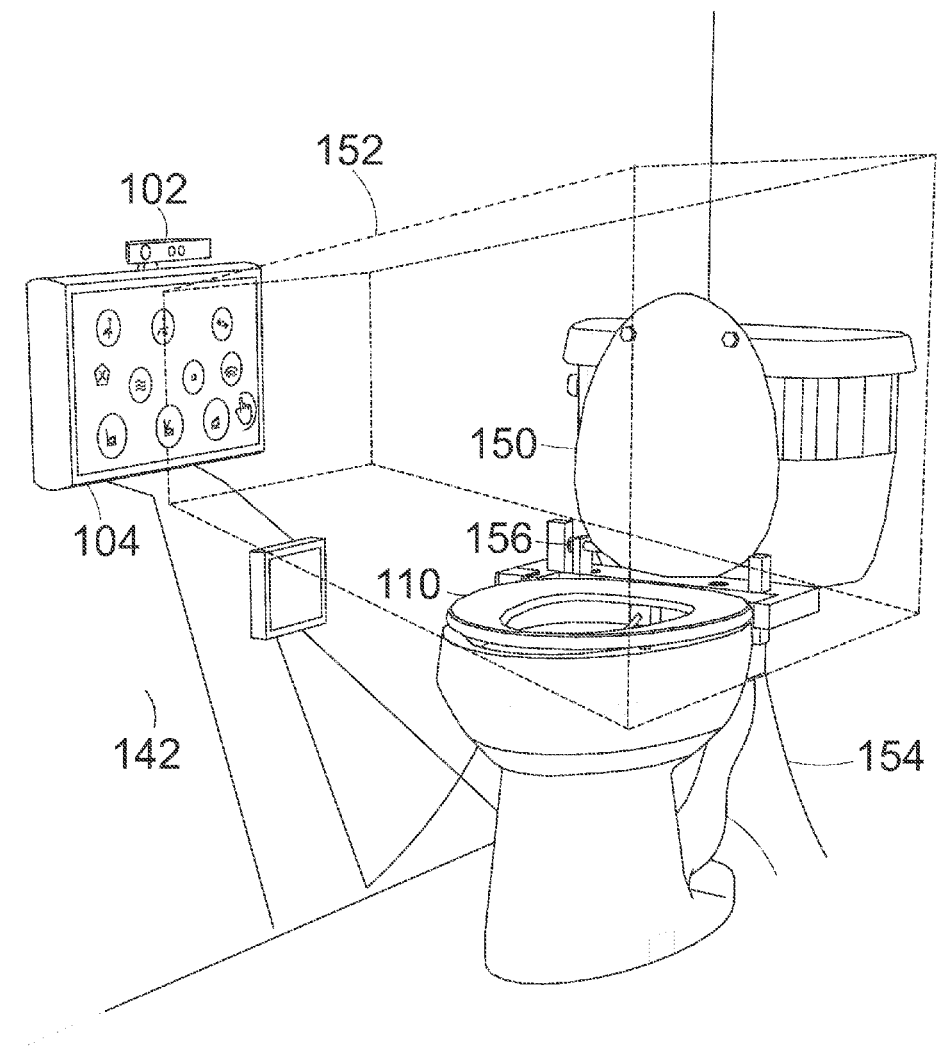
FIG. 2 shows a perspective view of a touch free input mid-air hand gesture controlled avatar toilet control panel.

FIGS. 1 and 2 First Embodiment

A Mid Air Hand Gesture Controlled Displayed Avatar Used to Operate a Toilet, to Avoid Contact with Bacteria
Description A Kinect sensor 102, in FIGS. 1 and 2, made by the Microsoft Company, of Redmond Wash., USA, and is connected to a Sony all in one computer 106. The sensor could also be an Intel real sense 3D camera.

The sensor 102 attaches to the display 104. The display 104 attaches to a wall 142 or stand. The display 104 connects to the computer 106, by wire 140 but could also use a Bluetooth wireless connection. The sensor user interaction zone, optimal range 152 of use is 0.8 to 3.5 meters from the sensor. The computer 106 connects to the toilet motor controller (not shown), by wire 132. The computer 106 and motor controller could also use Bluetooth radio waves, using Bluetooth transmitters and receivers in the computer 106 and to Bluetooth transmitters and receivers connected to the motor controller. The computer and motor controller, could use a Wi-Fi area connection to connect to each other, with WIFI transmitters and receivers in the computer 106 and the toilet motor controller (not shown). The motor controller connects to a bidet 138, seat servo motor 136 and to a lid servo motor 156, etc. by wire.

Evoluce software made by Evoluce Ag of Bunch am Erlbach, Germany, is programmed into the Sony computer 106. Evoluce software 106 works with Kinect for Windows software 106 which is programmed in the computer 106, the software empowers personal computers PCs with natural interaction capabilities. Kinect for windows software developers' kit maybe used to program the system. Microsoft windows 7 or windows 8 software can be used as the computer operating system. Evoluce software may be used, to program the avatar controlled display system.

The processors may be an, Intel Corporation or Advanced Micro Devices processor. The computer 106 can be programmed with an Apple, Nokia S40 operating system, Blackberry, Qualcomm, Linux or Microsoft's operating system software. The processor is connected to a memory device. The memory is used for storing retrievable data.

The computer 106 connects to the internet (not shown) using a WIFI connection, and by activating the internet icon button 116. The WIFI receiver is incorporated within the computer 106. The liquid crystal display 104 can show internet content, such as internet videos. With a speaker 127 and microphone 125 incorporated within the display 104 the user can make internet video calls. The user can search the internet by interacting with the Evoluce software 106, Kinect 102 and the display 104. The user can surf the internet, view internet web pages, watch internet TV, watch cable TV, view internet content and view and listen to internet videos. The user can search the internet with the results displayed on the display face 129. Internet search engine results can be displayed 104. Search engines such as Google, Yahoo, or Safari etc., can be used. The user may verbally chat with people, using the internet connection. The user may leave video messages on the display 104 for other users to access, activate and view.

An alternating current supplies power to the smart toilet 108 by a wire connection 154, to the display 104 by a wire connection 130, to the computer 106 by a wire connection 134, and to the Kinect 102 by a wire connection (not shown). The toilet 108, display 104, Kinect 102 and computer 106 could also be powered by a direct current battery (not shown). A warm dry air blower (not show) blows warm dry air on the display screen 104, to reduce fogging of the screen 104. The screen 104 senses when the screen 104, may be fogging, and automatically turns the screen defogger on.

For safety the system motors 136, 156, turn off, if a voltage overload is detected. The voltage overload may be caused, by a user contacting the moving seat 110 or lid 150 while they are moving. A slip clutch (not shown) between the motor and the part being moved, such as moving the seat 110 or lid 150 up or down, limits to a safe level the amount of force applied to a user, contacting the moving part. The motor or motors are turned off, when shaft rotation sensors (not shown) detect, when the seat 110 and lid 150 have reached their up or down position. The computer 106 signals the motor controller to supply a voltage, to the motors or motor, to move the seat motor 136 and lid 156 motor clockwise or counter clockwise, which raises or lowers the seat 110 and or lid 150.

The touch free user input device means, is the Kinect sensor 102. The touch free user input device software means, is the Evoluce Multi-touch & Gesture software, Evoluce Win&I software, image and Video Viewer for Kinect for Window 106, and Microsoft operating system software 106, and Kinect for windows software 106.

Devices like the Microsoft Kinect for Windows sensor 102 can either sit on top of or next to a screen 104 or a monitor 104. The Kinect for Windows sensor 102 is body movement recognition hardware, connected to the computer 106 by the USB. The avatar is controlled by the user's body movements. The sensor 102 and display 104 face the toilet area, and collect data about the scene if front of the sensor.

Kinect software 106 is programmed in the computer 106. A Microsoft operating system software window 7 or 8 is programmed into the computer 106. Evoluce Multi-touch & Gesture software, volume Win&I software, image and Video Viewer for Kinect for Window, media Viewer for Kinect for Window and PowerPoint Presenter for Kinect for Windows software application 106 is programmed in the computer 106.

The device may further include on-board data storage, such as memory coupled to the processor. The memory may store software that can be accessed and executed by the processor, for example. The host may be any type of computing device or transmitter including a laptop computer, a mobile telephone, etc., that is configured to transmit data to the device. The host and the device may contain hardware to enable the communication link, such as processors, transmitters, receivers, antennas, etc.

In FIG. 1, the communication link is illustrated as a wired connection, however wireless connections may also be used. For example, the communication link may be a wired link via a serial bus such as USB, or a parallel bus. A wired connection may be a proprietary connection as well. The communication link may also be a wireless connection, such as Bluetooth, IEEE 802.11 (IEEE 802.11 may refer to IEEE 802.11-2007, IEEE 802.11n-2009, or any other IEEE 802.11 revision), or other wireless based communication links. In another example, the system includes an access point through which the device may communicate with the internet. In this example, the device may not require connectivity to the host. The access point may take various forms. For example, if the device connects using 802.11 or via an Ethernet connection, the access point may take the form of a wireless access point (WAP) or wireless router. As another example, if the device connects using a cellular air-interface protocol, such as a CDMA or GSM protocol, the access point may be a base station in a cellular network that provides Internet connectivity via the cellular network.

As such, the device may include a wired or wireless network interface through which the device can connect to the access point. As an example, the device may be configured to connect to access point using one or more protocols such as 802.11, 802.16 (WiMAX), LTE, GSM, GPRS, CDMA, EV-DO, and/or HSPDA, among others. Furthermore, the device may be configured to connect to access point using multiple wired and/or wireless protocols, such as "3G" or "4G" data connectivity using a cellular communication protocol (e.g., CDMA, GSM, or WiMAX, as well as for "Wi-Fi" connectivity using 802.11). Other examples are also possible. Alternatively, the host may also include connectivity to the internet, and thus, the device may access the internet through the host.

In addition, for the method and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a compute readable storage medium, for example, or a tangible storage device.

The computer 106 is connected to the motor controller, by wire. The computer 106 is power by a powered by a connection to alternating electrical current and the motor controller is powered by a connection to an alternating current. The motor controller supplies power to the toilet electrical components, by wire. The Evoluce display 104 is powered and connected to an alternating power supply.

The display 104 shows toilet functions icons, such as, lid up 122, seat up 120, seat down 122, seat and lid down 118, a user profile activation icon 123, bottom air dryer blower icon 124, bidet front wash activate icon 126, bidet back wash activation icon 128, bidet wand forward and backward movement icon 112, stop button icon 114, internet connection to computer activation icon 116. Other toilet functions could be displayed such as, a bidet water aerator, an air deodorizer, an air filter, an air negative ion generator, an automatic toilet flushing device, a toilet seat massager, an anti-bacterial ultraviolet light, a recorded sound playing system, a bidet water pressuriser, etc.

The Kinect for Windows software developer's kit or Microsoft Robotics Developers Kit can be used to program the computer 106 for the Kinect sensor 102. An Intel perceptual computing software developer's kit could be used to build applications for the smart toilet applications. The Microsoft Software Developers Kit can be used build smart toilet function applications.

Various programming languages can used to program the computer 106 such as C++, C#, and Microsoft Visual Studio Ultimate, FAAST key mapping software, Microsoft Visual Programming Language, Microsoft NET 4.0 XNA 4.0, Silverlight 4.0, and Visual Basic.NET. This Software Developer's Kit allows developers to write Kinect applications in C++/CLI, C#, Microsoft Visual Programming Language, or Visual Basic .NET.

The Microsoft Robotics Developers Studio application contains a graphical environment, Microsoft Visual Programming Language: (VPL) command line tools which may allow a developer to deal with Visual Studio projects (VS Express version) by possibly using C#, and 3D simulation tools.

The computer 106 may be programmed using, the Microsoft windows commercial software development kit, or Linux operating system, or Android operating system. Or Blackberry operating system, or apple operating system.

Computer program code for carrying out operations of the object detection and selection mechanism may be written in any combination of one or more programming languages, including an object oriented programming language such as Java, Smalltalk, C++ or the like and conventional procedural programming languages, such as the "C" programming language or similar programming languages. The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

The object detection and selection mechanism is described below with reference to flowchart illustrations and or block diagrams of methods, apparatus (systems) and computer program products according to implementations thereof. It will be understood that each block of the flowchart illustrations, FIGS. 20 and 21, and or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 20:
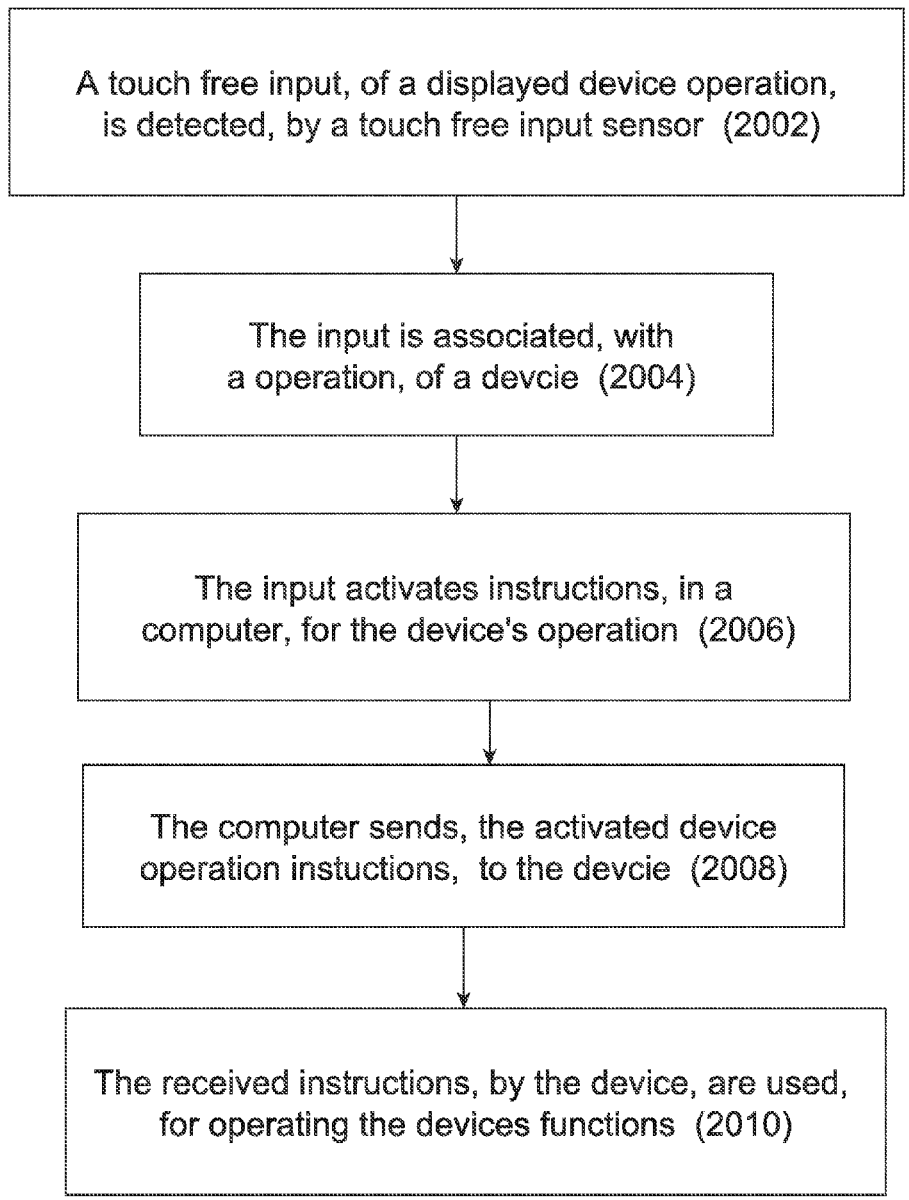
FIG. 20 depicts a flowchart of touch free input operation of a device having a control panel display.

In the device software and operation flowchart the following steps illustrate the touch free input devices operation, as shown in FIG. 20. A touch free input, of a displayed device operation, is detected, by a touch free input sensor (2002). The input is associated, with an operation, of a device (2004). The input activates instructions, in a computer, for the device's operation (2006). The computer sends, the activated device operation instructions, to the device (2008). The received instructions, by the device, are used, for operating the devices functions (2010).

These computer program instructions may also be stored in a computer-readable medium that can direct a computer or other programmable data processing apparatus to function in a particular manner, such that the instructions stored in the computer-readable medium produce an article of manufacture including instruction means which implement the function act specified in the flowchart and or block diagram block or blocks.

The computer program instructions may also be loaded onto a computer or other programmable data processing apparatus, to cause a series of operational steps to be performed on the computer 106, or other programmable apparatus to produce a computer implemented process, such that, the instructions which execute on the computer 106, or other programmable apparatus provide processes, for implementing the functions or acts specified, in the flowchart and or block diagram block or blocks.

Software steps of the touch free toilet display control panel operation, may include some of the following steps, step (a) the computer displays toilet function icons on a display screen, (b) computer senses user, in the user non touch device interaction zone, (c) computer senses user non touch input device used by user, (d) computer displays user input, interaction on display screen, (e) computer senses user has chosen one toilet device function for activation, from the displayed toilet device function icons, the chosen icon illuminates, (f) computer senses the activation request of the chosen device function icon, (g) computer associates chosen device function displayed icon, with instructions for the activation of the chosen device function, (h) computer checks toilet seat user occupied sensor, to discern if seat is occupied, (i) seat occupied, no, (j) before activating the bidet, the computer checks to see if toilet seat is occupied, if unoccupied the bidet won't be activated, (k) computer sends message to display that seat must be occupied to operate bidet.

The unoccupied computer will activate seat or lid up and down movements (l), (m) seat occupied yes, (n) if occupied bidet will activate, (o) computer senses user sitting on seat, won't activate seat or lid up or down movement, unoccupied will activate seat or lid up and down movement, (p) computer sends message to display that seat must be unoccupied to operate seat or lid, (q) the computer sends instructions to the toilet motor controller to supply a voltage to the device, (r) the motor controller receives the computer instructions to supply a voltage to the chosen toilet device, (s) the motor controller sends a voltage to the device, the device activates, (t) stop button icon activated by user, device deactivates, (u) computer senses voltage overload caused by lid or seat making contact with user while moving up or down, turns off power to seat or lid, (v) computer doesn't allow seat or lid to move in a direction against each other for example the lid moving down while the seat is moving up, (w) the device deactivates following a predetermined cycle, deactivating at the end of the cycle, (x) the computer instructs the motor controller to discontinue the voltage supply to the device, (y) the motor controller discontinues supplying the voltage to the device, the device deactivates.

Figure 21:
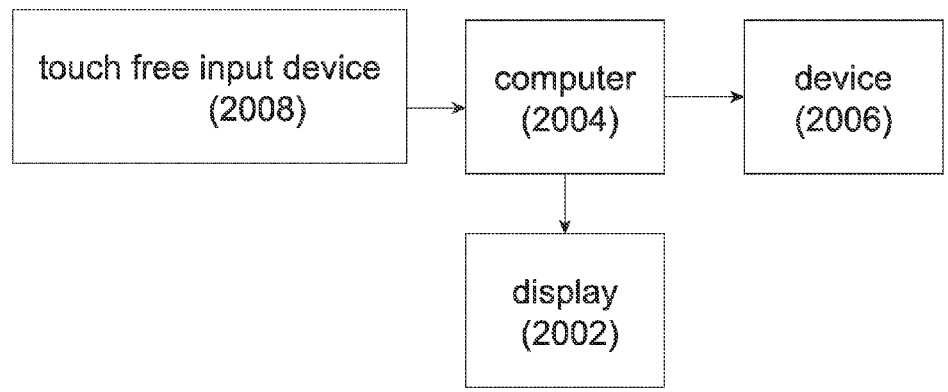
FIG. 21 illustrates a block diagram of hardware confections between a touch free input displays, incorporated into a device.

A block diagram of the toilet display control panel component connections are shown in FIG. 21, touch free input device (2108), computer (2104), device (2106), display (2102).

The toilet display control panel operation, may include some of the following steps, step (a) computer displays toilet function icons on a display screen, (b) computer senses user, in a user non touch device interaction zone, (c) computer senses user non touch input device used by user, (d) computer displays user input, interaction on display screen, (e) computer senses the user has chosen a toilet device function for activation, from the displayed toilet device function icons the chosen icon illuminates, (f) computer senses the activation request of the chosen device function icon, (g) computer associates chosen device function displayed icon, with instructions for the activation of the chosen device function, (h) computer sends device activation instructions to Satis smart toilet, (i) Satis toilet activates requested toilet device function, (j) the device deactivates following a predetermined cycle, deactivating at the end of the cycle, (k) stop button icon activated by user, deactivates device, (l) Satis sends message to computer that device has deactivated, (m) illuminated icon of the chosen device stops illuminating.

The computer 106 can signal the motor controller to activate the bidet 138, heated seat, seat and lid motors, bottom air dryer, and the bidet water temperature heater, etc. The Kinect sensor 102 is connected to the computer. The computer 106 is connected to the, motor controller. The motor controller is connected to the motors 136, 156. The bidet 138 connects to a common, standard pressurized water supply (not shown).

A Phigets motor controller (not shown) is programmed with Phigets software, made by the Phigets Company, 106. Phigets motor controller software 106 is programmed into the computer 106. The motor controller is connected to either an alternating electrical power supply or to a direct current power source, and directs power to the other electrical components.

The computer 106 could also be a laptop computer, a desktop computer, a portable computer, and a tablet computer, and a computer processor connected to other computer components, etc.

A Mid Air Hand Gesture Controlled Displayed Avatar Used to Operate a Toilet, to Avoid Contact with Bacteria Operation The Kinect sensor 102 senses a user, in FIGS. 1 and 2, and turns the display 104 and toilet 108 on. The system comes out of low power mode. The Evoluce and Kinect software 106 recognize that the user is available for interaction, when the user waves one hand, by moving their forearm left and right, facing the Kinect sensor. The Kinect's 102 user skeletal tracking is used to track the user's movements.

The user moves their hand in front on of the screen 104 and Kinect sensor 102, the hand controls a displayed avatar, a displayed pointer or cursor in the shape of a hand, viewed in the display. Either hand can be used to control the avatar. The computer programmed with the Evoluce software 106, understand the user's touch free body movement input, the body movement moves and controls the displayed avatar cursor. The computer 106 moves the cursor, following the hand movements and body movements of the user. The user points the palm of their hand toward the screen, and moves the cursor on the screen. The user moves the cursor until; the cursor is touching the toilet function icon they want to select. The user moves the cursor to the desired menu toilet option. When the cursor to touches the icon function, the icon is highlighted, illuminated, brightened or changes color.

The user activates the chosen toilet devices functions by holding the cursor 146 on the icon which starts a visual timer 146, after about 1 second's time the icon function activates. The visual timer 146 is a encircling of the cursor 144 by a circular line 146.

The user's touch free device activation request input, is received by the computer 106. The user's input request for device activation is identified by the computer 106. The activated function request is processed by the computer 106. The computer identifies the device to be activated, the instructions of the operation of the device, and the sequence of the operation of multiple devices. The computer 106 requests the motor controller to send a voltage to the toilet component. The component receives the voltage and actives. The computer 106 sends the motor controller instructions to stop the voltage to the component. The motor controller stops the voltage to the component. The component stops receiving a voltage and stops functioning.

For example activating the bidet 138, and instructing the bidet cleaning wand 138 to release water. The user moves their hand in front on of the screen 104, moving the cursor 144 to the bidet icon 126. The user activates the bidet function 126 by holding the cursor 144 on the bidet icon 126, which starts the visual timer 146, after about 1 second's time the bidet icon 126 function activates. The bidet's 126 activated function request is processed by the computer 106. The computer 106 associates the activated function with instructions 106, to supply power to the bidet 138. The Sony 106 requests the motor controller to send a voltage to the bidet 138. The computer 106 instructs the motor controller to supply power to the bidet 138. The motor controller supplies a voltage to the bidet 138. The bidet 138 activates and the bidet 138 sprays water out of the bidet's cleaning wand 112. The bidet 138 could also have more than one cleaning wand 112, etc. The bidet cleaning wand 138 can complete a computer 106 controlled, 35 second time period cycle, and stop at the end of the cycle. The user can also stop the bidet wand 112 by activating the stop button icon 114. When the cleaning cycle is completed, the computer 106 instructs the motor controller to discontinue power to the bidet 138, the water stops spraying out of the wand 112. The Kinect sensor 102 detects when the user has vacated the toilet 108, the system is put in low power mode. The user can stop the devices by activating the stop button 114.

The user can activate profiles of preselected toilet device settings and the sequence of the toilet device operations, by activating the profile activation button. The user can create a user profile by accessing a menu of toilet device settings and the sequence of the toilet device operations.

The toilet device's sequence of operation, can follow the stored profile, the sequence of the devices operation and settings. The profile may contain device operations such as, having the seat move 110 to the down position and the lid 150 moving to the up position. When the computer 304 senses the user has occupied the seat 312, the sequence can continue, with the activation of the bidet 138 front wash, the front wash can activate and cycle through a wash cycle, with the water temperature set to mild, the water pressure spray set to mild, the water aerated, when the bidet 138 wash has completed its cycle, the bottom air dryer 124 activates, directing drying air at the bottom. The dryer may have a setting of high air flow and medium air temp, the air blower follows a timed cycle and turns off at the end of the cycle. When the user vacates the toilet seat the lid 110 can be lower, the toilet 108 can automatically flush. The toilet 110 lowers the lid 150 before flushing the toilet 110, this can aid in containing airborne water droplets, caused by the flushing of the toilet 110. The airborne water droplets may also contain bacteria, by minimizing their spread in the air; the bacterial contamination may also be minimized. To avoid spaying water out of the toilet 108, a sensor (not shown) detects when the user is seated on the toilet seat 110, and will only activate the bidet 138 when the seat 110 is occupied.

Figure 3:
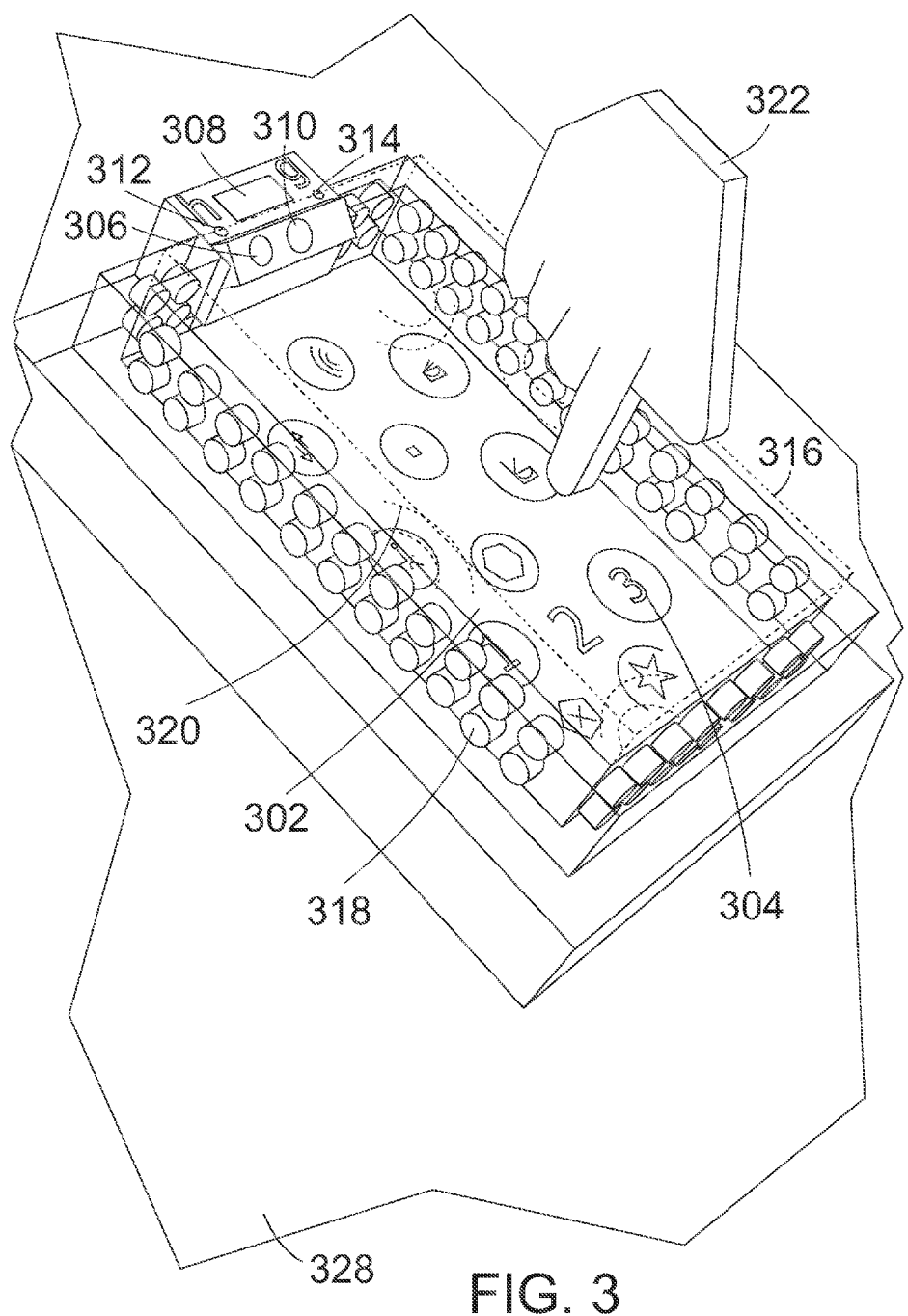
FIG. 3 illustrates a perspective view of a touch free input floating capacitive elevator control panel.
Figure 4:
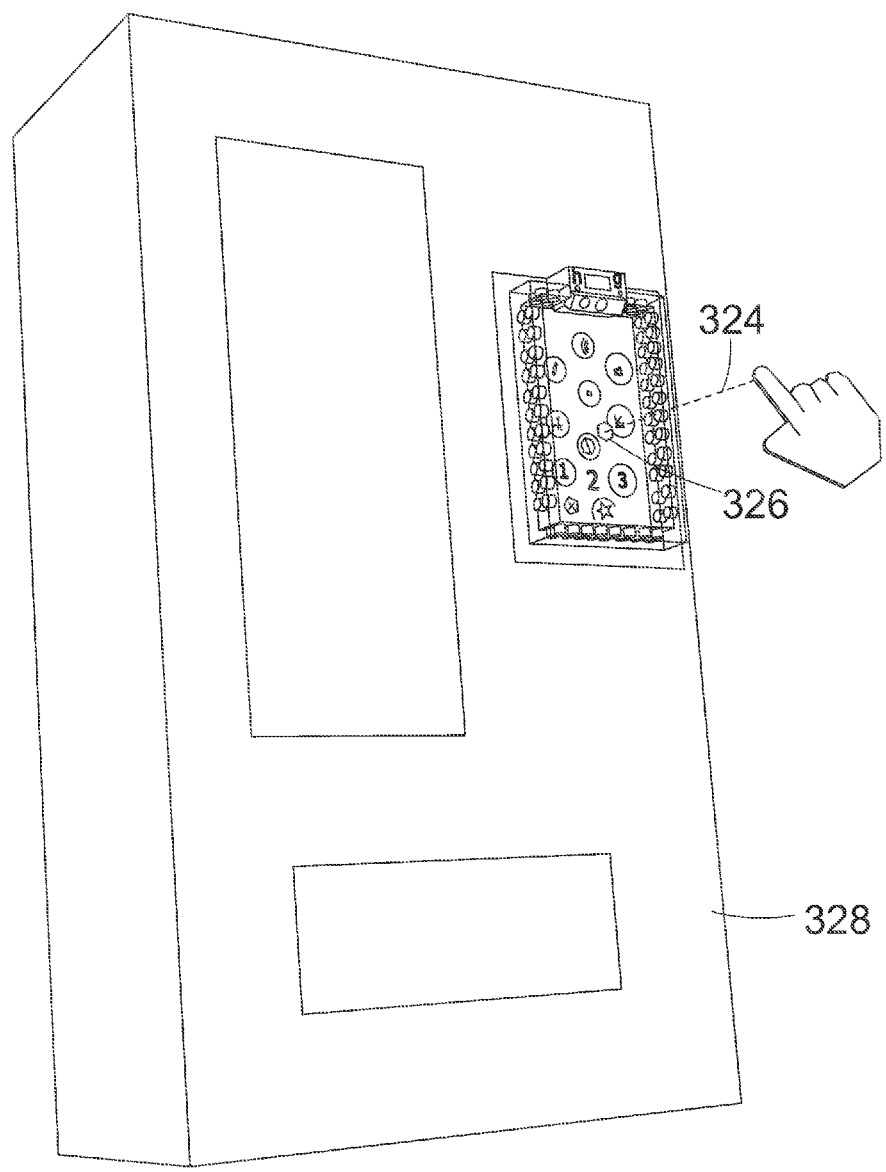
FIG. 4 shows a perspective view of a touch free input mid-air hand gesture controlled avatar vending machine control panel.

A Mid Air Capacitive Field Above a Display Used to Operate a Vending Machine Hygienically Description The midair display 302 uses a input able STMicroelectronics mid-air floating capacitive field 316, above the display face 302, shown in FIGS. 3 and 4. The capacitive field could also be created, using a Fogale floating capacitive field. The display is incorporated into a vending machine 328.

A mid-air gesture, or gesture in mid-air, operated avatar and touch input display, can also be used. The display has a gesture recognition sensor or camera 306 which follows a user's finger or hand 322 in midair above the display 302 illustrated in FIGS. 3 and 4. The menu display icons, could also be on a plastic printed panel displaying the icons (not shown). The gesture sensor detects, mid-air hand gestures, above the printed display icons.

Additional touch free input devices, are incorporated in the display. A microphone 314 and speaker 312, and voice recognition software, is used for voice recognition activation of displayed icons 304. An eye tracking sensor 308, and eye tracking software, is used for eye tracking input. Eye sight tracking and eye recognition, are used to operate a displayed avatar, to activate displayed icons. Hand gesture recognition, where the hand's shape is associated, and used for the activation activate displayed icons. A projector 310 for projecting an interface display on a user's hand. A brainwave detecting headset (not shown) worn by the user, which communicates with the display, and is used to input activate displayed icons, and operate devices connected to the display. A mid-air hand controlled avatar 326 synchronized 324 to the user's hand movements and gestures, as shown in FIG. 4.

The displayed icons 304, text or symbols 304, can be input able, able to be inputted, to a connected computer. The computer is connected to the device. The user's finger can move an avatar 426, on the display. The avatar moves in synchronization 424 with the user's finger. The avatar moves over, or partially contacts, a displayed icon, to activate the icon.

The display can be connected and or used, to operate an electronic device, such as, a smart phone, used as a control panel for an elevator, a store checkout payment input panel, a input panel in a static electric environment, a space station device, or flammable environment work area device, an automatic teller machine ATM, a smart toilet operating control panel, an interactive museum display, an interactive public display, a heavy industry display used to operate a device, a room automation display, and a display for public service machines, etc.

The user input activated displayed data, can be used do operate the electronic device, by sending data to the computer. The computer then sends instructions associated with the received data, to the electronic device. The electronic device receives input instructions, from the computer. The computer instructions affect, the operation of the electronic device. The input using the display, operates the device.

The computer connects to a motor controller. The computer instructs the motor controller, to send power to the devices components. The display can also be a touchscreen display, or non-touch display, or midair touch screen.

A Mid Air Capacitive Field Above a Display Used to Operate a Vending Machine Hygienically Operation The user touches in mid-air in front of the icon 1712 that they want to activate on the vending machine display, as illustrated in FIGS. 3 and 4. The display allows the user to select products, from the machine. By inputting their product selection, touch freely. The user midair touch inputs, above displayed icons, and or a displayed number keypad, to operate the machine. The user can pay for the product, using the display. The user may use a credit card or debit card reader or with currency to pay for the product.

The user can activate the desired icon, by moving their finger into a predetermined activation plane 840, shown by a visual line 840, of 2 to 5 centimeters above, the displayed icon which they desire to activate. When the user's finger reaches the activation plane, above the icon, the icon is activated. A sign shows, that the display uses haptic mid-air touch 836. A sign shows, that the display uses mid-air gesture recognition 838.

A virtual keyboard can be displayed on the display. The keyboard allows the user to mid-air touch above the keyboard, to activate the keyboard keys, to input text, letters, keyboard symbols and commands.

The user can also use, a midair display, for mid-air touching of icons, voice recognition, midair gestures, or eye tracking, etc., to operate the vending machine.

A user may also use an avatar 426 displayed on the display, to touch input activate displayed icons, illustrated in FIGS. 3 and 4. The user may move the avatar with their finger in mid-air, above the display. The avatar will follow 424, the fingers movements. The finger moves the avatar, to an icon. When the avatar contacts an icon, the user can, input touch activate the icon, by moving their finger in mid-air, in a tapping motion. The midair gesture recognition sensor 306 recognizes, the finger tapping gesture, as a touch input. Other gestures can be programmed into the computer, to operate the display.

The computer senses, the icon activation input. The activation input is associated with computer functions, the functions are associated with the operation of the device. The functions associated, with the operation of the device are activated. The activated instructions, are sent to and instruct a motor controller to supply a power to the device, in accordance with the activated device instructions. The input operates, the device.

In a different system configuration, the display computer could also, communicate with a devices computer, sending operating instruction to the device computer. Instructions which the device computer, can use to operate the device. The computer informs the devices computer, of the input activated functions associated, with the operation of the device. The device follows the functions, associated with the operation of the device.

The activation area 806 can be adjusted, to differing heights above the icons. A different angle such as 65 degrees, from the icon can be used. The icon horizontal activation size area can be, smaller or larger. The user can also touch, the touchscreen to activate a desired icon function The display may the operated by finger multi touch, multi finger input finger swiping, finger zoom in and out, screen rotate, etc. The display can play video, with sound produced from a speaker. The transducers are held in place, by translucent clear plastic, to allow a user, a view of the transducers.

To avoid touching the screen, visual, audio, and or midair haptic touch feedback can be used, to inform the user, of their distance for the screen. Visual aids, such as, a line 840, that shows where the finger activation zone begins can be used. The color of the display screen can change, as the finger gets closer to the screen, the screen gets a brighter red, as the user's gets finger gets closer to the screen.

The distance informing devices, may be visual displays on the display, and illuminated distance lines. A speaker, may use sound to alert a user, of their finger distance to the display. Midair haptic touch, maybe used to give a finger, midair touch feedback distance information. The distance feedbacks, allows a user to stop the forward movement of their finger, toward the screen. Stopping the forward movement of their finger toward the display, allows the user to avoid touching the display face.

A variety of devices that may be used, to inform, alert a user of their fingers distance to display panel. The display can turn orange as the finger gets close to screen. A speaker can makes an alert sound, such as, beep sound can be used. When the user's finger 820 enters close to display zone. A sound whose frequency increases, as the user's finger gets closer to the screen, can be used.

The transducers 318 in a transducer array may create, a mid-air haptic touch feel, on the user's finger as it approaches the screen. The mid-air touch feeling 320 may increase as the finger 322, gets closer to the display. Midair haptic feedback, can also give a click feel to the finger, when the icon activates. Haptic feel can give the air above each icon a different feel, FIG. 4 shows the display, used as a vending machine input panel. The user's hand 322 movements, operates the displayed avatar.

The display can also show a three dimensional view. The display, can show a 3D image of the user's finger, moving and touching 3D icons. The touching of the icons, by the finger can be interpreted as a touch input of the icons. The activation of the icon is associated the activation of the device function that the icon represents. The icons represent device operations, which can be activated, by activating the icon, with a detected touch input. The display can also be a mid-air display, which can display objects two dimensions 2D, or in three dimensions 3D. The midair 3D display can showing icons in 3D.

The user's finger can be displayed traveling in 3D space. The user moves their finger in midair, in view of the midair gesture recognition sensor, in front of, perpendicular to the display. The 3D icon is activated by the user touching or the 3D icon with their avatar 3D finger.

In some embodiments, a computer system is provided that includes an input device having a mid-air surface utilized for providing input to the computer in response to user input, a first sensor configured to determine a position of a user's hand relative to the surface, and a second sensor configured to determine a touch of the user's hand on the mid-air surface. The computer system also has a processor communicatively coupled with the input device, and a memory communicatively coupled with the processor. The display in communication with the processor, is provided and configured to receive data from the processor, to provide a virtual image of the user's hand overlaying, an image of the input device. The image of the input device shows discrete input members, and an image representing the user's hands overlaying, the image of the input device. The displayed discrete input members are aligned at least in part based on the determined position of the user's hand relative to the surface.

Additionally, or alternatively, the user's digits may be shown in positions illustrating, what input their digits overlay. That is, the illustrated digits may be shown as being over particular characters, icons, etc., that the discrete input devices, will be interpreted as by the computing system.

If contact is determined to be input, an indication that input was received may be provided. For example, one or more haptic devices may provide haptic feedback to a user, an audible indicator may be provided, and or the virtual input displayed on the display, may indicate input by illuminating, darkening or generally changing the characteristics, of a particular virtual input button. Additionally, the system performs a function corresponding to the received input. The input operates the device.

Icons can be a representation of the devices components they operate. Displayed symbols, pictures, data etc., can be uses to aid the user in choosing a product. As the users finger gets close to the icon, visual feedback can show, the area around the icon changing to a yellow color. When the user finger touches and activates the icon, the icon can change shape or color, such as, the icon can change to a bigger shape, and or change to the color green. The changing icon, gives visual feedback that the icon has activated.

The displayed avatar, can also be used to, activate displayed icons. The avatar is operated by the users hand and finger movements and gestures, in midair above the display. The mid-air gesture recognition sensor, detects the user's fingers in mid-air, in front of the display screen. The user operates the avatar in midair, to mid-air touch input displayed icon.

The display can display a user's avatar in two dimensional or three dimensional environments. The display can be a liquid crystal display LCD, or a water droplet mid-air display. The activated icon, activates a device's function, operates a part of the device.

Additional touch free devices can be combined in the display to enable users to operate a device using different touch free inputs. Following is an example, of the differing touch free input devices used together, in the display, to allow a user, a variety of possible input methods. The user accesses the vending machine, by using voice recognition. The user says hi', the microphone 314 which is connected to the computer hears the user's hi. The vending machine says hi, from the speaker 312. The user puts their hand near the display, with their palm facing upward, a projector 310, projects a display on the user's hand. The user touch inputs, on the projected display, on their hand, the vending product they desire. The display, display's the funds needed for the product. The user 322 changes the product selection, by using a brain wave headset (not shown), to highlight their desired product on the display. The user desires a different product, and uses mid-air touch input, to choose the different product. The user desires another product, and uses eye tracking input detected by the eye tracking sensor 308, to choose the additional product. The user desires a different product, and uses mid-air touch input to choose the different product. The user desires a different product, and uses mid-air hand and gesture finger input, to choose the different product. The user desires a different product, and uses their cell phone display, which is connected to the vending machine, by a blue tooth radio waves, for displaying the machines product display. The input to choose the different product. The machine delivers the product to the user.

In an additional embodiment, the display screen can be flexible, with holes in the screen. With transducers under the screen. The screen allowing ultra-sonic energy to pass thru the screen, which creates a haptic mid-air touch field, above the screen face. Transducers can be arranged around display edge, underneath display, at a variety of angles to the display, to create differing, haptic feelings, above the display face. The screen maybe made out, of graphene.

Figure 5:
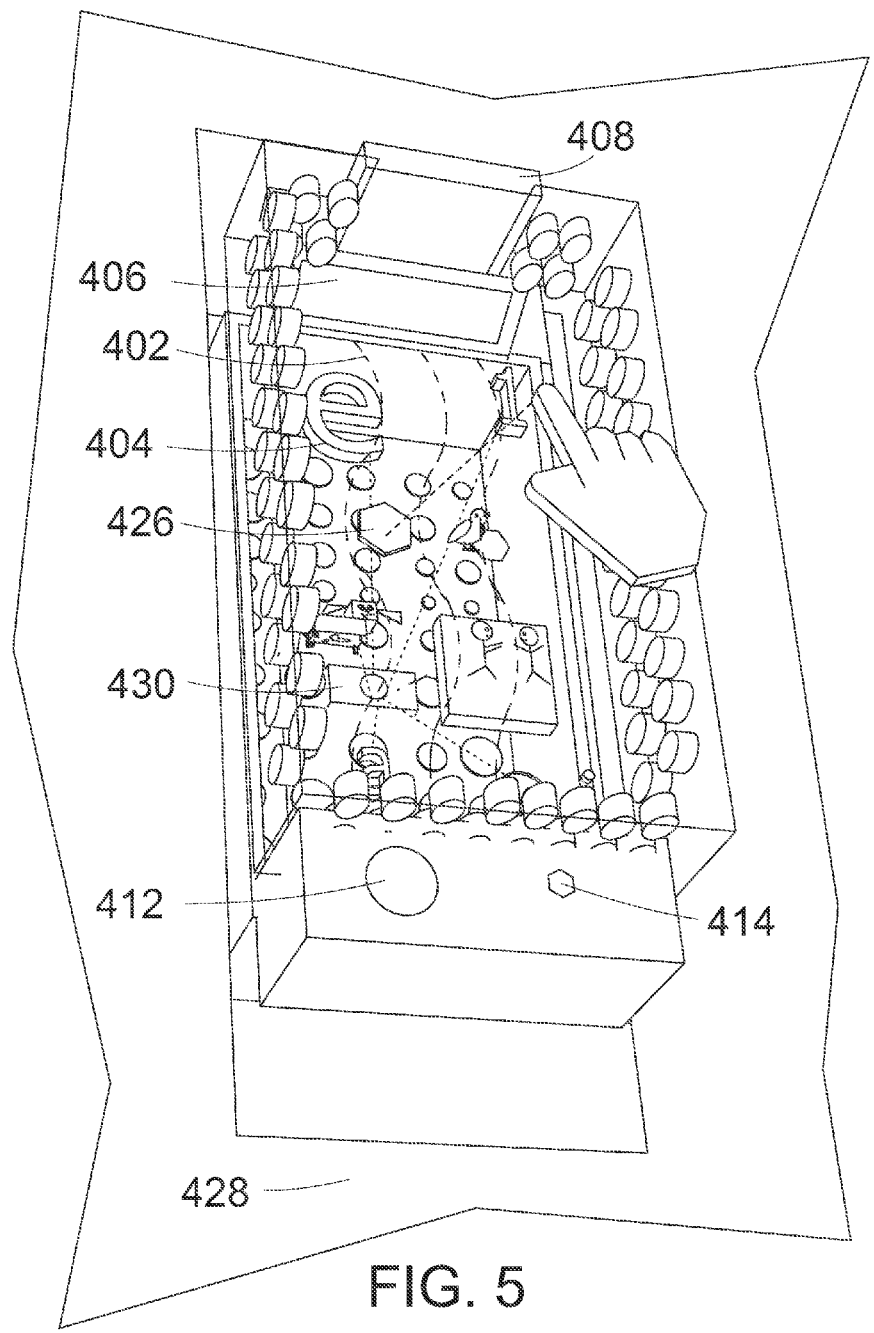
FIG. 5 shows a perspective view of a touch free input elevator mid-air display control panel.
Figure 6:
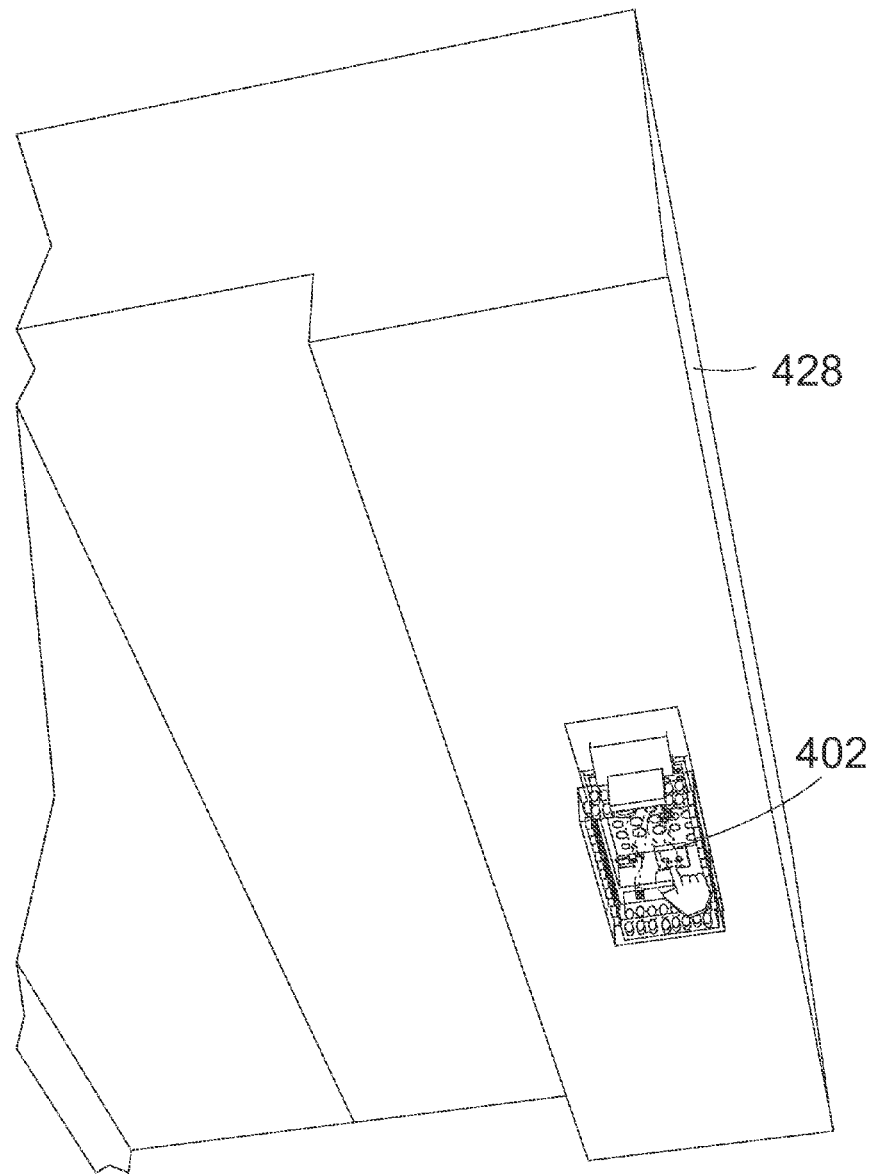
FIG. 6 illustrates a perspective view of a touch free input elevator mid-air display control panel

A Midair Touch Display and Other Touch Input Devices Incorporated into the Display is Used to Avoid Bacterial Transmission, Operate an Elevator Description and Operation A midair touch display 402, and other incorporated touch input devices, are used to avoid bacterial transmission, while operating an elevator, as illustrated in FIGS. 5 and 6.

The display could be used, in the operation of an elevator 428. The displayed 404 information could be icons 404, which include the floors that-the elevator travels to, such as, floor one, floor two, open and close the elevator, icon, elevator stop icon, elevator emergency talk, listener communication with people outside the elevator, using a speaker and microphone, and emergency stop button etc.

For example, the user enters the elevator, and moves their finger and touches the desired mid-air second floor number two button. The computer detects, the user's number two icon button input. The computer instructs, the elevator to move to the second floor. The user exists the elevator, when the elevator reaches the second floor.

The user could also, activate the icon 404, by moving their finger into a predetermined activation plane of 2 to 5 centimeters above, the displayed icon that they desire to activate. When the user's finger reaches the activation plane, above the icon, the icon is activated. The activation plane, can also be set to the displayed icons. The user touches one of the mid-air icons, and the icon activates.

The Displair midair display, is connected to a laptop Computer (not shown). The display uses a mid-air gesture recognition camera sensor. What is seen on the laptop display, is displayed on the midair display, shown in FIGS. 5 and 6. The laptop display is projected, onto the plane of midair water droplets 402. The midair display acts as a second display, for the laptop. The midair display can also, be connected to a desktop computer, and be the desktops only and primary display.

The laptop could also be an apple laptop with an OS 10 operating software, or a Sony computer programmed, with an open source software such as Linux, or Sun Java software. The midair display could also, be a Liea midair display, made by the Liea Company of Poland, with Liea midair operating software.

The display can show videos, with sound, ads can be displayed, music videos can be display, and improvements in elevator music can be made. Facilities on different building floors, can be shown, such as, dentist offices, etc.

The mid-air display can be 2 dimensional or 3 dimensional, displaying objects in 2D or in 3D space. The display acts, as a touchscreen display, for the connected laptop computer The Displair device projector 430 projects still and moving images onto a "screen less" display, consisting of cold stable air flow containing particles of water 402, produced by a cavitation method. These particles are small enough, not to leave traces of moisture, and their surface tension high enough, to maintain stability after contact, with physical objects and wind.

The Displair uses third party computerised multi-touch technologies, to allow control of images with fingers, or with other objects. The display can work with up to 1500 touch points simultaneously, with a delay time of less than 0.2 seconds. This makes it possible to allow manipulation, by more than one user, and also to identify more complex gestures. Scent and smell, and flavoring and taste interaction with projected images, maybe possible.

The display can be connected to a variety of electronic devices, such as, the elevator. The display can be used as the elevator control panel 402, to operate the elevator 428, shown in FIG. 5. The display can be connected, to and be part of, a variety of public use devices, such as, a control panel for a vending machine, a store checkout payment input display, an automatic teller machine ATM, interactive museum displays operating a device, interactive public displays operating a device, heavy industry display, room automation, and public service machines, etc., The display produces low static electricity discharge, when using the input panel. The low discharge may be beneficial, in a dry space station device environment, or a flammable work area environment.

Software to operate the connected devices can be programmed into the computer. In an additional configuration, the display computer could also communicate the input, with a devices computer which can operate the device. The display displays imputable data, such as text, symbols icons, etc. The imputable data is associated with the operation of the elevator. Video with synchronized sound emanating from a speaker, can be displayed.

The display displays the various, operating functions of the connected device. The devices operating functions, are associated with the displayed devices operating functions. The device's operating functions are displayed on the display. The displayed functions are associated, with the operation of the device, by the computer.

Other Touch free input device can also be used with the display, such as, an eye tracking and eye recognition, using eye tracking sensor 408 with eye tracking software. Brainwave detecting devices activating displayed icons. The icons can be associated, with operational functions of the elevator.

A user may use an avatar 426, displayed on the display, to touch input displayed icons. A microphone 412 and speaker 414 voice recognition software is used for voice recognition. Midair gestures, can be used to input, activate displayed icons. The display can also use a number of user hand gestures inputs such as mid-air touch, touch input, midair swiping, zooming in and out.

Ultra sonic transducers in a transducer array, may create a mid-air haptic touch feel, for the mid-air display, and for each icon. Haptic feel can give the air above each icon, a different feel. The different feel, allows the user to associate a unique feel, to a unique icon. The associated feel could allow a user, to input icons by the feel of the icon. Midair haptic feedback can also, give a click feel to the finger, when the icon activates. Haptic feel on the user's finger, as it approaches the screen. The mid-air touch feeling, may increase as the finger, gets closer to the display.

The mid-air touch input means is the Displair display and software. The eye tracking means is the Tobii eye tracking sensor and software 508. The voice recognition means, is the microphone 414, and Microsoft voice recognition software. The device means, is the elevator. The mid-air avatar controlled means, is the Leap sensor 406. The brain wave input means, is the Neurosky brainwave sensor (not shown). The projection on the hand means, is the interactive Pico projector (not shown). The computer operating system software means, is the Microsoft software.

Figure 7:
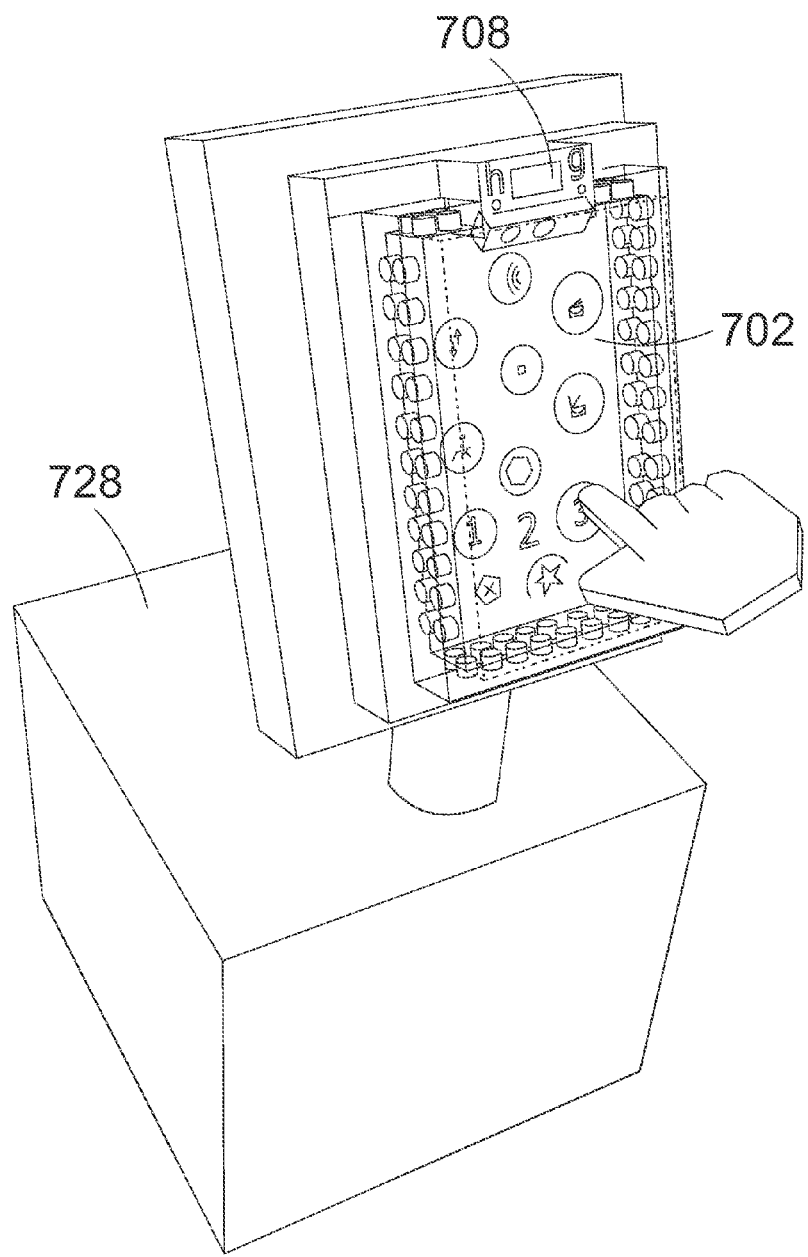
FIG. 7 shows a perspective view of a touch free input medical device control panel.

A Touch Free Medical Device Control Panel Used to Avoid the Transmission of Bacteria Description A mid-air gesture touch free panel display 702 can reduce the problem of germs being transferred, from an medical device control panel, such as, a dental clinic multiuser x-ray machine control panel, by decreasing the need to contact the panel's face, with a user's finger, as shown in FIG. 7. The mid-air gesture medical device control panel, is connected to a computer. The computer, is connected to the medical device 728. The medical device could include a variety of medical devices, such as, a Magnetic Resonance Imaging machine MRI, etc.

The mid-air gesture above display, uses the Tobii eye tracking sensor 708 and software. A Cambord Pico camera is used for mid-air gesture recognition. The displays other, incorporated touch free input device's components are the same.

A Touch Free Medical Device Control Panel Used to Avoid the Transmission of Bacteria Operation The user uses eye tracking, to operate the medical device, as shown in FIG. 7. A displayed avatar, moves to where a user looks, on the display. The eye movements 1716 control the movement, of the pointer, avatar or cursor 1712, on the display. The eyes acts as a mouse, controlling in synchronisation with the eyes, the movement of the pointer, on the screen. The user moves a displayed avatar, with their eyes, to an icon, or to data, they want activated The user controls the cursor, and chooses medical device menu options, by positioning the pointer over the desired menu option on the display. A tool bar is displayed for operating the cursor. The tool bar has commands, such as, right click, left click, scroll, zoom, save, etc. The user move the cursor to an icon, then looks at the control bar double click option, which highlights. The user then looks back at the cursor, and the cursor double clicks the icon, as illustrated in FIG. 7. The user activated icon, corresponds to functions that operate the medical device, x-ray machine 728.

Figure 8:
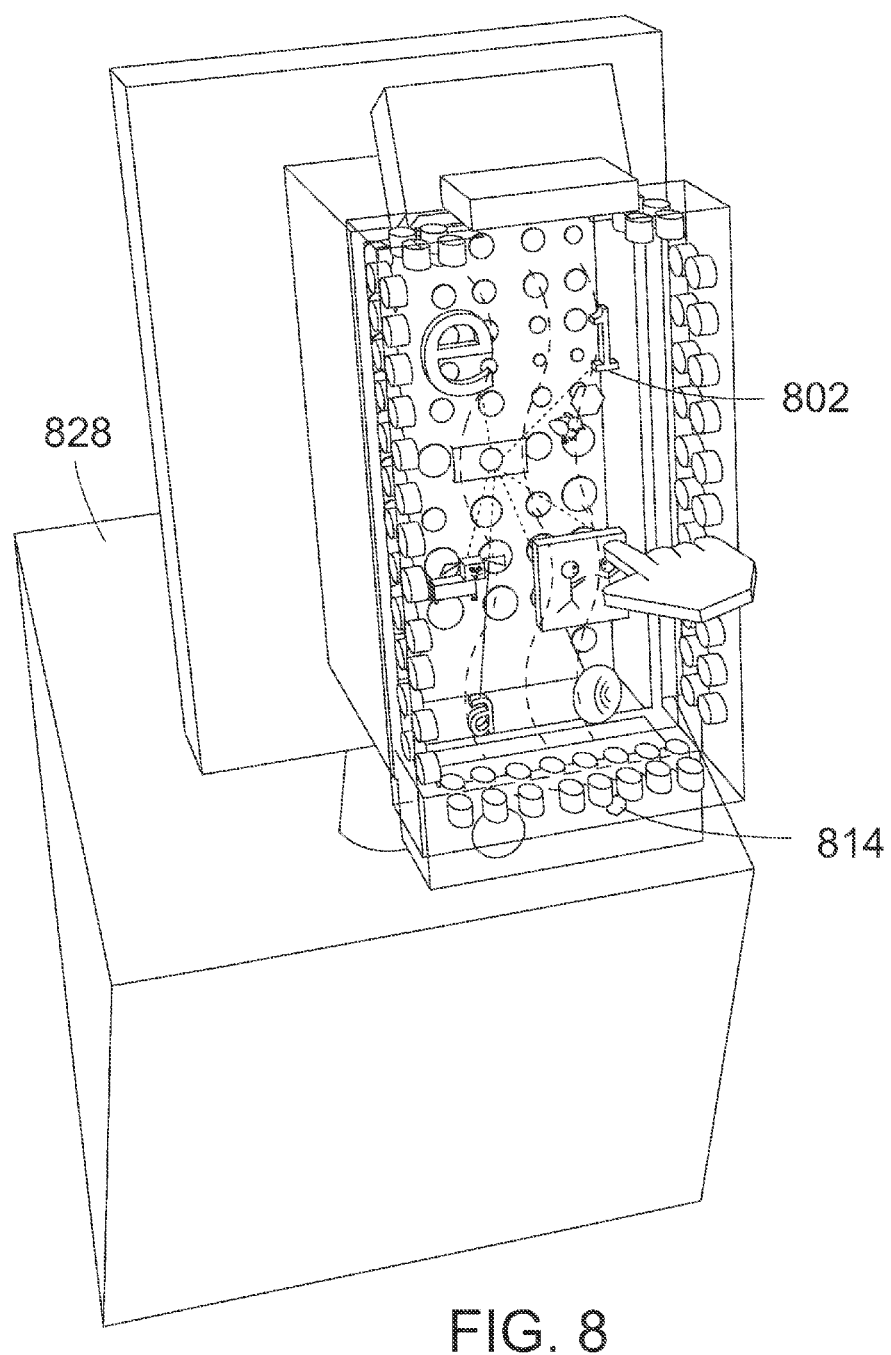
FIG. 8 shows a perspective view of a touch free input store customer input mid-air display control panel

A Touch Free Store Check Out Payment Machine Control Panel Used to Avoid the Transmission of Bacteria Description and Operation The user pays for products using financial payment instruments, such as, a smart phone payment system communicating with the store checkout machine 828, a credit card, or debit card, as shown in FIG. 8. The user may use the mid-air display 802, to midair touch input their account number, and password, etc. The user midair touches, the mid-air displayed numbers, on a displayed number keypad. The mid-air 802 display maybe used for self-service checkout, by the user.

The user midair touch inputs, displayed icons and or a displayed number keypad 802, to operate the self-serve checkout machine. The user may use other touch free input devices, to operate the store machine, as illustrated in FIG. 8. The user can use midair touch, touching of the icons of the midair display, a voice recognition microphone 814, midair gesture control of a displayed avatar, or an eye tracking sensor to operate the vending machine, etc.

Figure 9:
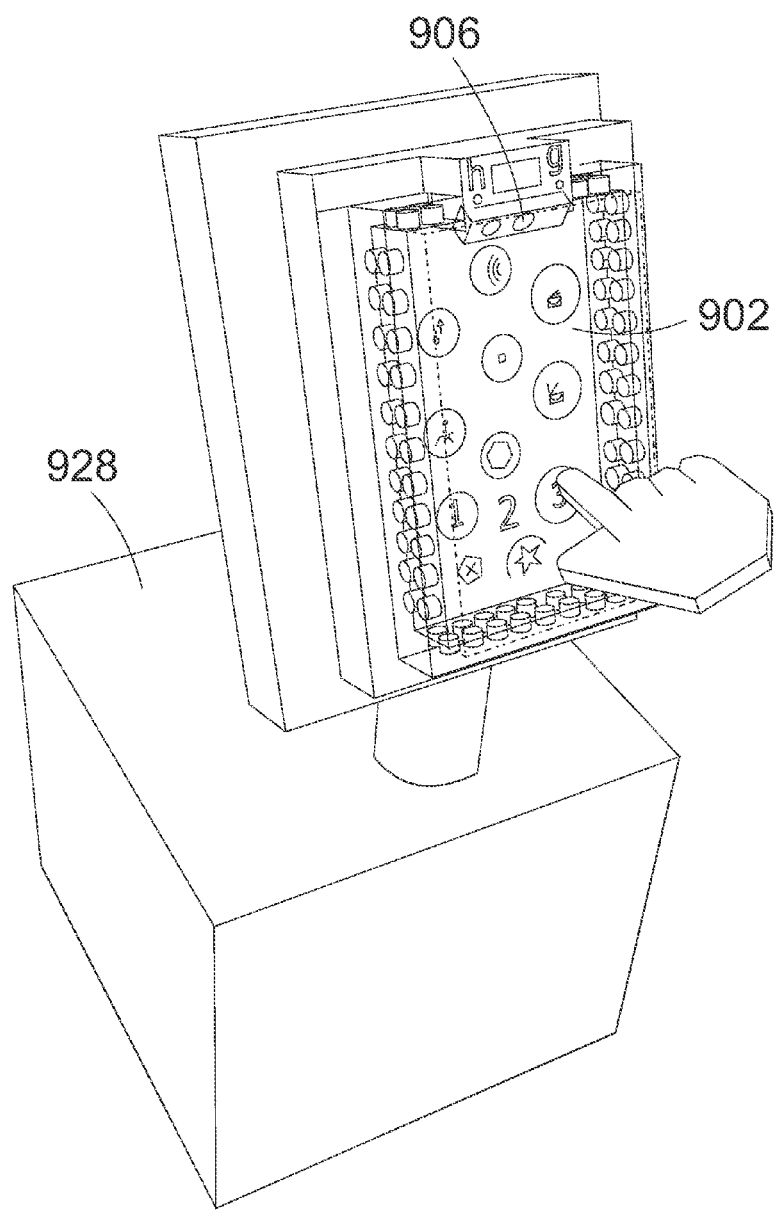
FIG. 9 illustrates a perspective view of a touch free input space station device control panel.

A Touch Free Space Station Device Control Panel Used to Avoid Static Electric Discharge Description A gesture in mid-air displays computer, can connect to a space station devices, such as, a space station toilet, motor controller, or a space station device computer, as illustrated in FIG. 9. The mid-air gesture touch free control panel display 902, can reduce the problem of static electricity in space, by decreasing the need to contact the panel face with a user's finger. User activated icons correspond to functions, which operate the space station device 928. The space station devices could include a variety of space station devices, such as, a space station robotic operating arm control panel, etc.

The display uses to an Elliptic labs ultrasonic gesture recognition sensor 906, as shown in FIG. 9. A gesture recognition ultrasonic sensor screen display chip, made by the Elliptic Labs Company of Norway. The computer is programmed with Elliptic labs sensor floating gesture recognition user detection software, floating ultrasonic field generating device software, computer operating software, and. computer operating system software. The computer can also be programmed with software that runs the space station device 928. The display could also communicate the users input, to a computer which may run the device. The displays other, included touch free input devices, components are the same A Touch Free Space Station Device Control Panel Used to Avoid Static Electric Discharge Operation The user move their finger, above the display 902, which moves and controls a displayed avatar, as shown in FIG. 9. The displayed avatar, activates the displayed icon, which is associated with the operation of the device. The user may also touch the panel face, surface, too activate an icon, if they desire to use the touch screen.

Figure 10:
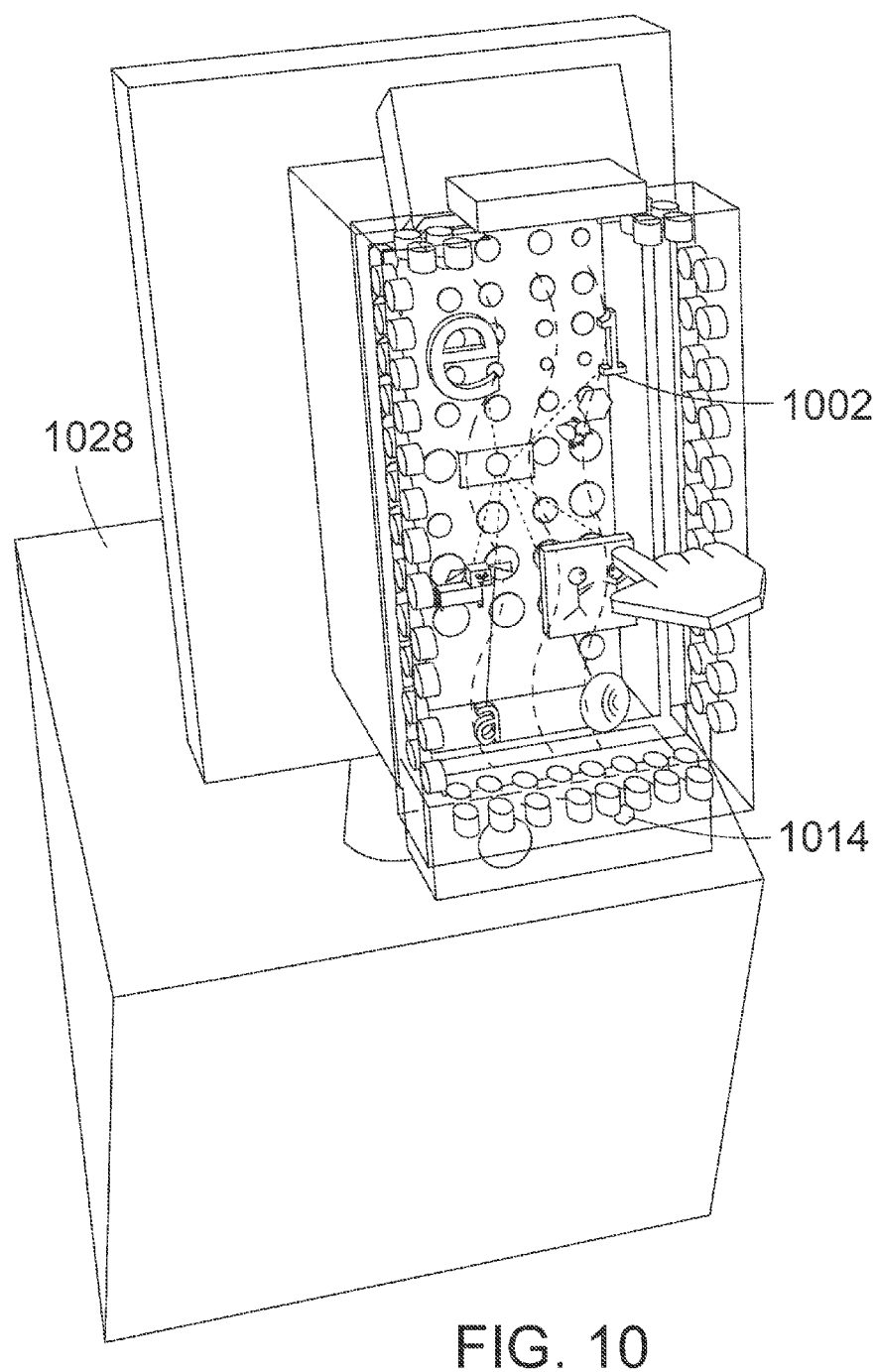
FIG. 10 shows a perspective view of a touch free input store customer input mid-air display control panel

A Touch Free Flammable Vapor Environment Device Control Panel Used to Avoid Static Electric Discharge Description A mid-air display touch free control panel 1028, can reduce the problem of static electricity, in a flammable vapor environment. The display decreases the need, to contact the panel face with a user's finger. The approach to contacting the panel face with the finger, my create a static electric discharge, between the user's finger and the display panel, as shown in FIG. 10. The electric discharge, my ignite air borne flammable vapor or material. Environments with flammable vapor in the air, may be, grain silos, petroleum refineries, etc. The panel 1002 is connected to the flammable vapor environment device 1028.

The mid-air display, uses Microsoft voice recognition software and microphone 1014. The displays other included touch free input devices, components are the same A Touch Free Flammable Vapor Environment Device Control Panel Used to Avoid Static Electric Discharge Description Operation The user uses voice commands, to highlight, and activate a display's displayed icons, as shown in FIG. 10. The icons are associated with the operation of the flammable vapor environment device. The flammable environment device could be a, gas compressor.

Figure 11:
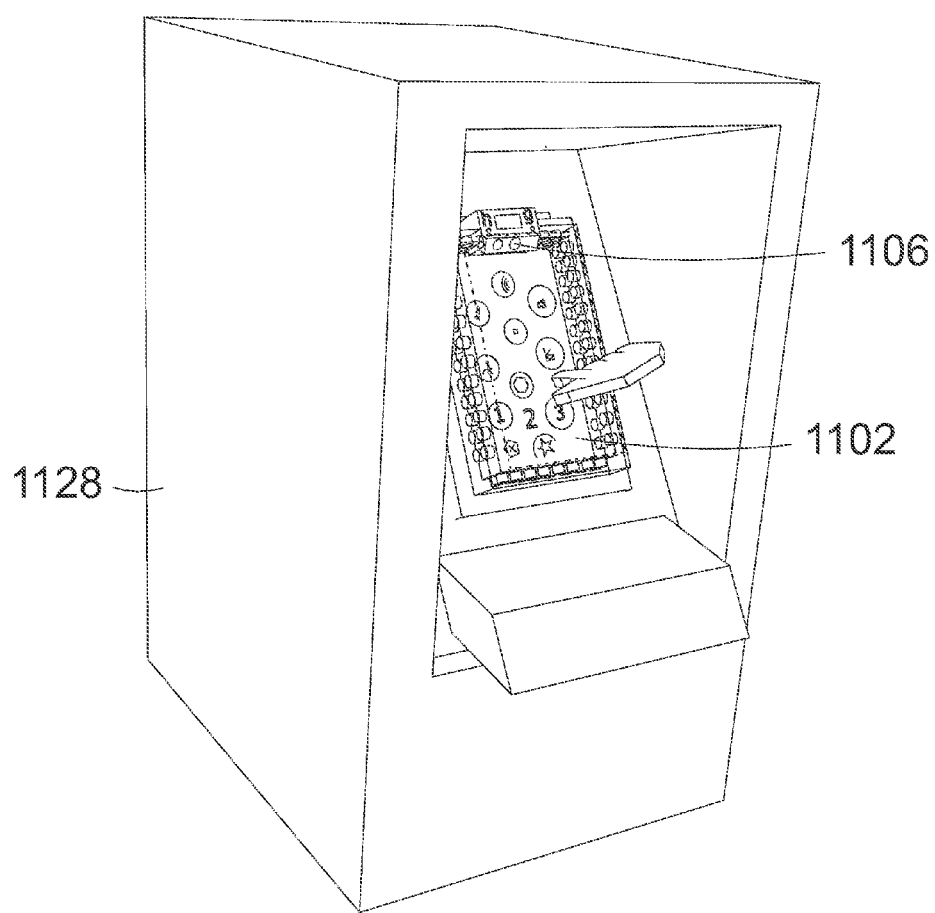
FIG. 11 shows a perspective view of a touch free input Automated Teller Machine device control panel.

An Automated Teller Machine Control Panel Used to Avoid the Transmission of Bacteria Description A gesture in mid-air recognition avatar and touch input display assemblage 1102, is connected to an automated teller machine, as illustrated in FIG. 11. The display is connected to an automated teller machine ATM 1128.

The mid-air display, uses the Leap mid-air gesture recognition sensor 1106, and Leap software. The displays other included touch free input devices, components are the same An Automated Teller Machine Control Panel Used to Avoid the Transmission of Bacteria Operation The user touches above the icon, that they want to activate, the icon activates, on the automated teller machine display 1128, as illustrated in FIG. 11. The activated icon input operates the ATM. The ATM uses the touch free display, to accept user cash deposit, cash withdraws, and other banking transactions.

The user can use, midair gesture, voice recognition, midair gesture control of a displayed avatar, or eye tracking, etc. to operate the automated teller machine.

Figure 16:
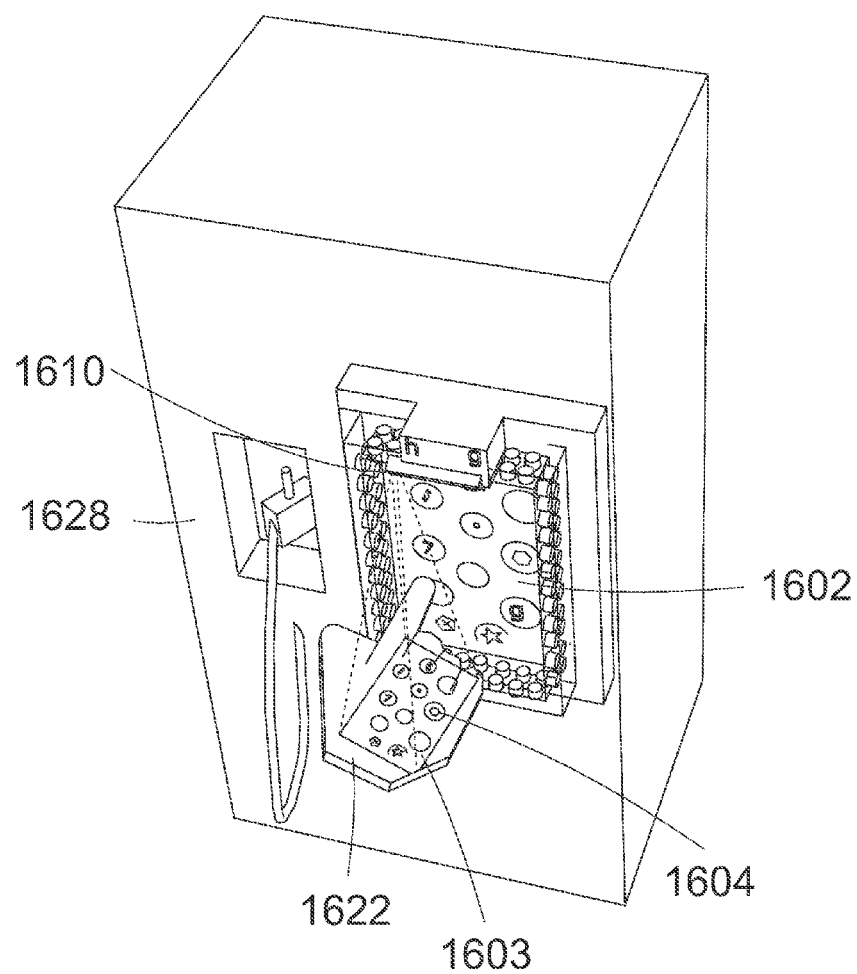
FIG. 16 shows a perspective view of a gas pump projected input able display control panel.

An Interactive Projection on a User's Hand to Avoid the Transmission of Bacteria Description A Pico projector 1610 for projecting a touch input display 1603, on a user's hand 1622, is connected to a gas station self-sever gas pump 1628, as shown in FIG. 16. The display 1602 is incorporated, into the gas pump. The display 1602 and projected display 1603, acts as the gas pump's, user input panel. The projector projects an interactive menu 1602, of displayed gas pump functions, images, and icons 1604 on to a surface, as shown in FIG. 16.

A user avoids the transmission of bacteria, petroleum substances, and dirt, by touching a projection, on their hand, to operate the gas pump. The interactive projector 1610 is made by the Pico Company. The project could also be an Epson projector made by the Epson Company, or a Light Blue Optics projector made by the Light Blue Optics Company, or an interactive laser projecting a display. The projector 1610 is positioned, for projecting on a user's hand 1622, in front of the display face 1602. A sign (not shown) instructs the user to place their hand with the palm up, facing the projector, in the projection zone. The projector connects to a Toshiba computer (not shown) inside the gas pump 1628.

The projector detects when a user touches an icon 1604, projected on the user's hand. The detected touch of the icon 1604, is interpreted as a touch input of the icon 1604. The touch input is used to operate the gas. The user can connect to the internet, by touching an internet icon button.

The touch free user input device means, is the Pico touch free interactive projector, Pico projector software and Microsoft operating system software, Android operating system software, and the gas pump application software.

An Interactive Projection on a User's Hand to Avoid the Transmission of Bacteria Operation The user uses the interactive input display, projected on to a hand or surface, to operate the gas pump, as shown in FIG. 16. The user 1622 can activate the projected icons 1604, by tapping their finger on the projected icon. The user touches icons or data on their hand, to choose the octane of gas, to pay for the gas, etc. The surface may be the hand 1622, or another desired surface, such as a piece of paper, etc. The user avoids dirt, being transferred from the display 1602, to their fingers. The user uses the hand touch user interactive projected display 1603, to operate the gas pump 1628.

The user can also activate the icons 1604, by touching above the icons, in mid-air, while they are projected on the surface. The users finger in mid-air, blocks the projection, creating a shadow on the projection. The mid-air finger movements, are used the activated the displayed icons. The projector 1610 recognises shadows created by hand gestures in front of the projector.

The computer associates the activation of the icon, with instructions for the activation of the gas pump's 1628 functions. The computer sends the device function activation request, to the gas pump. The user can stop, the gas pump functions, by pressing the stop button on their hand.

Figure 12:
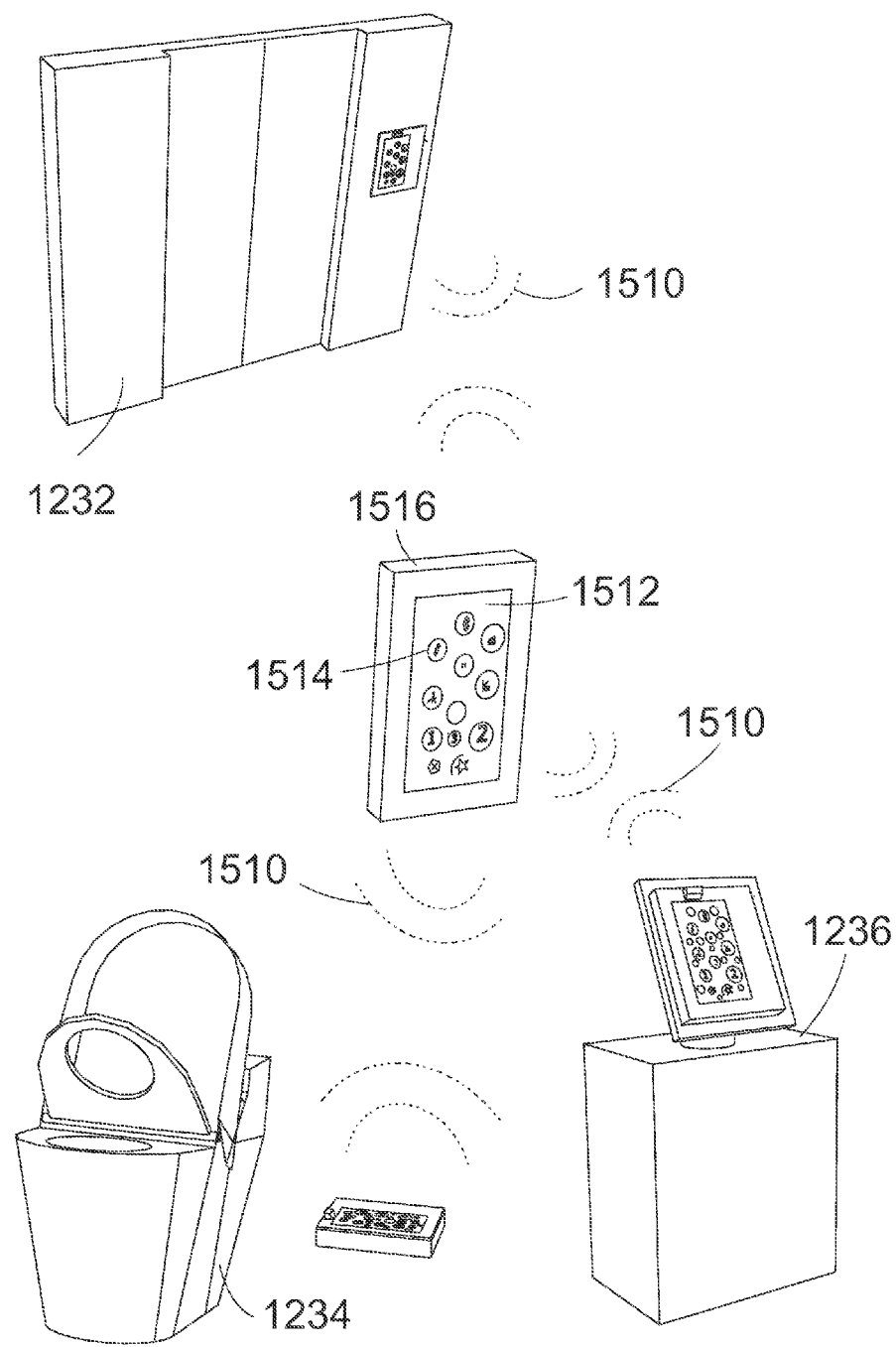
FIG. 12 shows a perspective view of a smartphone wirelessly connectable to other devices.
Figure 13:
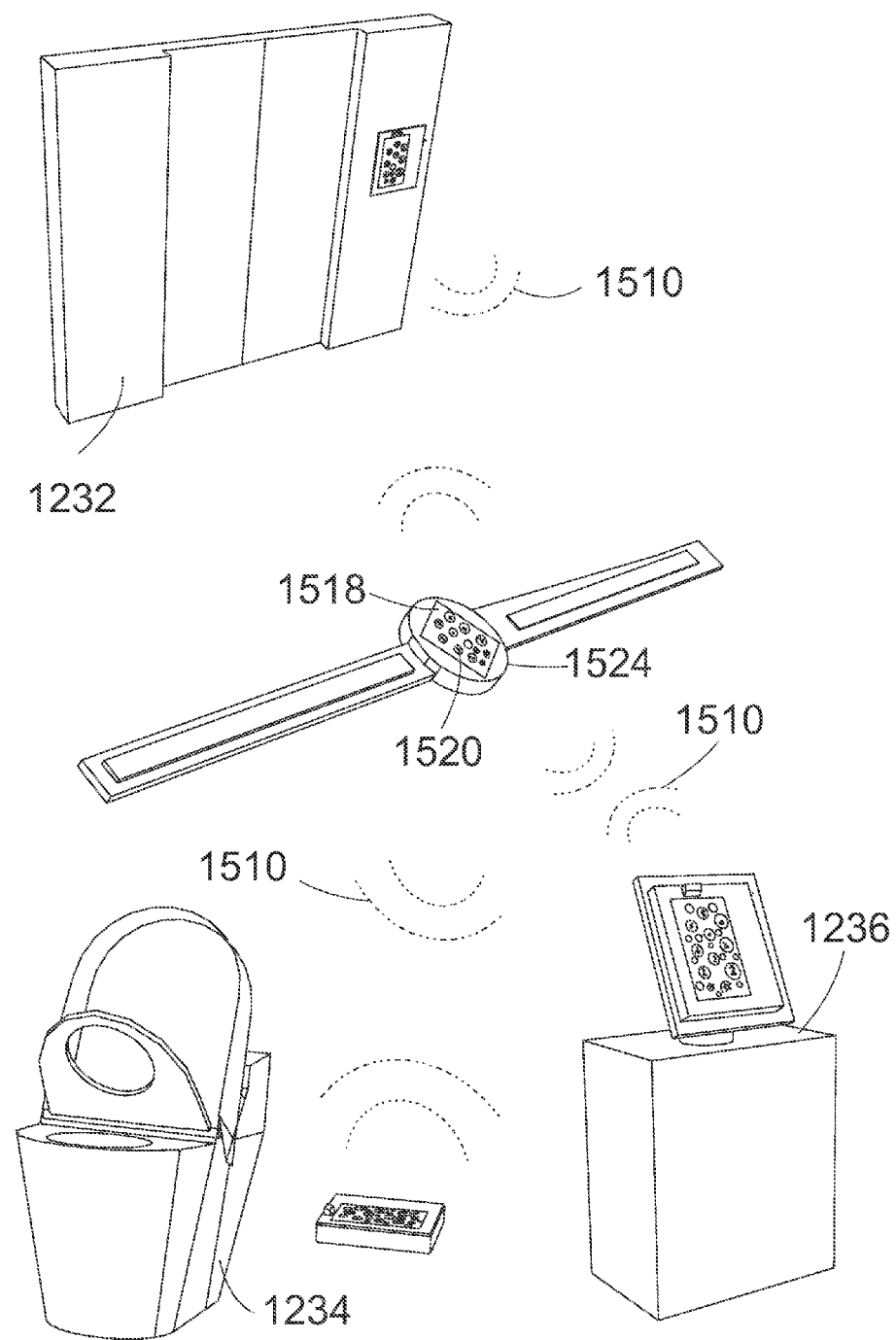
FIG. 13 shows a perspective view of a smart watch wirelessly connectable to other devices.
Figure 15:
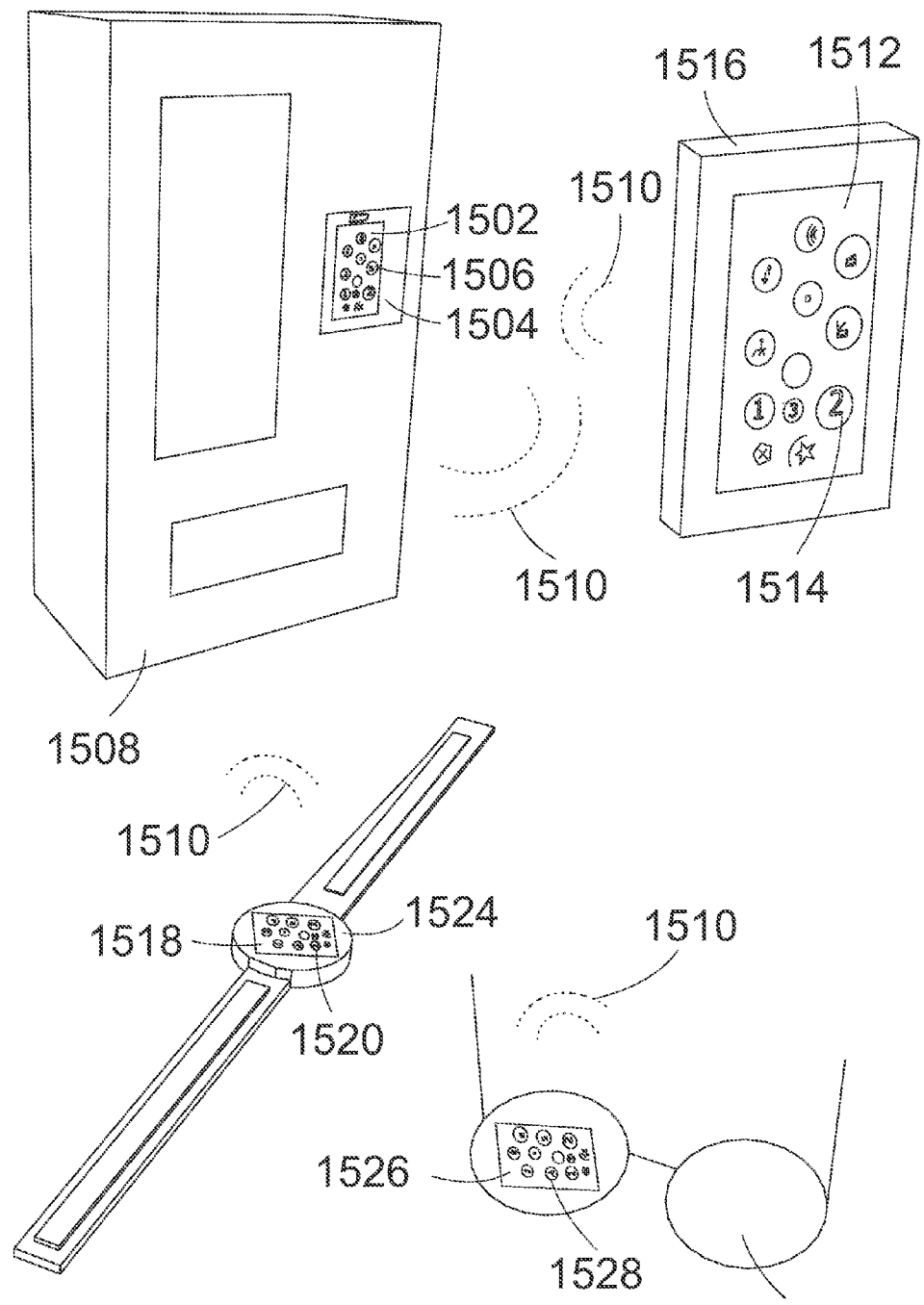
FIG. 15 shows a perspective view of a smart phone, a smart glasses and a smart watch, wirelessly connectable to other to a vending machine.

A Smart Phone Tablet, Wearable Wristwatch or Smart Eye Glasses' Computer can be Users to Operate Public Interactive Devices Hygienically Description and Operation Personal computing devices can operate, detached devices hygienically. A smart phone 1516, tablet computer, a portable computer, a wearable computer smart wristwatch 1524, and or a google smart computer eye glasses' 1530, etc., can be users to operate public interactive devices, 1508, as shown in FIGS. 12, 13 and 15. Public interactive device may include electronic devices, such as automated teller machines ATMs, hotel doors locks, store pay checkout stations 1226, vending machines 1508 station gas pumps, space station devices, toilet remote controls 1234, flammable environment devices, medical devices, elevators 1232, space station devices etc.

The computer wristwatch, smart phone, glasses can connect to the electronic devices using Bluetooth 1510, WIFI, or other radio means of communication. Infrared communication could also be used between the user's portable device, and the electronic device, to be operated by the user. The phone, glasses, or watch displays are used to input data to the connected device, to operate the device.

The portable computer device can connect to a multitude of differing public, or private devices. The various devices have a common radio communications procedure with the portable device, which allows the devices to communicate with the portable device the public devices. The portable device communicates with the external device, automatically with each other when, they are within range, within proximity to each other. When the portable device, and the external device are connected, with each other, the external device's, electronic operating panel visual display, is automatically downloaded to the portable device.

The devices communications proximity may be 5 to 8 meters, the device and portable devices automatic communication is a pre-set radio protocol. The distance which the portable connects to the device, can be set by the user of the portable, or set by the devices operator. The distance which the portable and the device can connect can be far, for example, 100 meters or more, or close than 0.3 meters.

The portable device can communicate individually with a variety of public devices, for example, a user may use a smart phone, to operate an elevator. The user then goes to an ATM, after operating the elevator, and uses the phone to operate the ATM. The user puts the funds on their phone, from a withdrawal from the ATM. With funds from the ATM on the user's phone, the user goes to the vicinity of a vending machine 1508. The user operates the vending machine, by touch imputing the vending machines menu display, which is automatically displayed on the phone. The user pays the vending machine, with funds have been downloaded to the phone, and which are displayed on the phone 1516, and are touch inputted to the vending machine. The funds transferral, to the vending machine, is approved by the user. The user can also pay, by directly removing funds from their bank account, which can be displayed on the phone. The user could also use a PayPal account, or credit card information on the phone, to pay for the vending machines products. The user can then buy merchandise at a store, and pay for the products, with the phone, at the store checkout machine 1236.

The portable device, and public device, has a computer software that allows them to communicate and operate, with each other. The software allows for the transference, download of operating panel displays, from the external devices to the portable device. The portable devices, such as, the wristwatch automatically connects, to the device, when the user is within a predetermined range, possibly 0.5 meters to 7 meters depending on the type of device, and closeness to other devices. When the user connects with the device, information can be exchanged between the devices, such as, the user's identification information.

The devices input panel display, can be sent, to the watch and displayed on the watch's display 1518. The user can use the devices displayed icons 1506 which are displayed on the device's display 1502 operating panel 1504, and on the watch 1520. The watch display touch input icons, can be used to touch input to the device. The touch inputs can be sent to the device, as touch inputs of the icon functions. The display on the watch can be the same or similar the devices display. The watch display acts as a secondary input panel, as shown in FIGS. 12, 13, 14 and 15.

Also some devices, can use the watch displayed touch icons 1520, as the only or primary input panel for the display, such as, a display for a smart toilet. The display could also be non-touch input, such as, voice recognition input, mid-air gesture recognition input, to active displayed icons. Icons, text, symbol, and scrolling data choices, can be displayed on the portable devices, and used to display a menu of a connected devices functions. The user can choose from the icons, or scroll a menu of choices, to activate the various device's functions.

Google smart glasses display 1526, can display a devices icons 1528, and can be used to connect to and operate an electronic device, such as the vending machine 1508.

The watch could show the input screen of an ATM. The user can input data to the smart phone such as, pin number, ATM services, such as, withdraws deposits, etc. The ATM's display, displays on the watches display, or a display similar, to the ATM's display, is shown on the watch display.

A phone 1516 has an automatically downloaded input display from the elevator, the display 1512, displaying touch input icons 1514 similar, to the elevators display. The downloaded display, is used to operate the elevator. For example, the user is near, the elevator call operating buttons. The phone connects, to the elevator computer. To use the elevator 1232, the user presses the up button on the phone display. The elevator up button is illuminated on the panel, and on the phones displayed up button 1514. The elevator door opens, the user enters the elevator. The user presses, the desired second floor number 2 button icon, on the phone. The elevator panel illuminates, the number 2 button. The elevator computer, receives instruction from the phone, to move to the second floor. The elevator follow the instructions, and moves to the second floor. The elevator doors open apron arrival, the user exists the elevator.

The google glasses' 1530 can use a Tobii eye tracking and eye gesture recognition sensor (not shown), connected to the computer and programmed with Tobii software, to operate the external device's input panel 1528, displayed on the glasses lens. The eye sensor is attached to the glasses, and views the user's eye or eyes. The user moves a cursor, on the display 1528, by looking at where they want the cursor to move to. The user controls the cursor, and chooses toilet menu options, by positioning the pointer over the desired menu option 1528 on the display. A tool bar is displayed for operating the cursor. The tool bar has commands, such as, right click, left click, scroll, zoom, save, etc. The user move the cursor to an icon 1528, then looks at the control bar double click option, which highlights. The user the looks back at the cursor and the cursor double clicks the icon, as illustrated in FIG. 15.

The transference of bacteria and viruses, from public operating panels, is limited to the users contacting their own bacteria, on their own phone. By touching their own device, the user only contacts bacteria, by users of the phone, which may be limited to themselves.

The user can pre-set their input information to the device, such as, the user pre-sets an elevator floor of 3, into their cell phone. The user move into proximity, with the elevator. The cell phone detects the elevators radio waves, and connects to the elevator. The elevator receives the automatic request, to transport a user. The up button illuminates. The elevator arrives, to transport the user. When the user enters the elevator, the pre-set 3 floor request is automatically sent to the elevator. The elevator 3 floor request lights up, to show its activation request.

The user can create, pre-set a user profile with pre-set settings stored on their portable computer, phone, etc. The settings profile can be used for a variety of devices, such as, smart toilets, automotive car setting, room temperature settings, and room light settings.

The users pre-set profile setting could also be stored on the internet, on a server, on the internet cloud. A user can be in the vicinity of a device. The user's portable computer connects to, and communicate with the device. The user's identity and address on the internet, can be sent, to the device. The device can have a connection to the internet, and can look up the user's profile, and device settings on the internet. The internet settings can be used by the device, to set the device to the user pre-set settings.

Toilet settings could include, bidet water temperature. Car settings, could include a radio station frequency, or the height of an automatically adjusted car seat, etc.

The smart phone, and or other portable devices, can reduce the possibility of static electric discharge, when using touch, to touch input on a display screen, to operate a device. Since the phone is part of the person's electrical field, the chance of static electrical discharge is reduced, when touch inputting into the phones display. The phone may be beneficial in a flammable environments, such as, a paint plant, an oil refinery, a flammable dust grain elevator, or in dry environments, such as, outer space stations.

If the portable computer connects to two or more external devices, at the same time, the display will show the plurality of devices that it has connected to. The user can choose, which device which they choose to operate, by touching the displayed device icon, on the portable computer display.

The user can set the portable computer, to manually connect to a device, by turning off, the portable's automatic connecting, to an external device setting. The user would be in the vicinity of the desired device, to be operated, and turn on the portable's wireless receiver, to search for an external device. The portable would be connected, to the device that the user is in proximity too.

Figure 14:
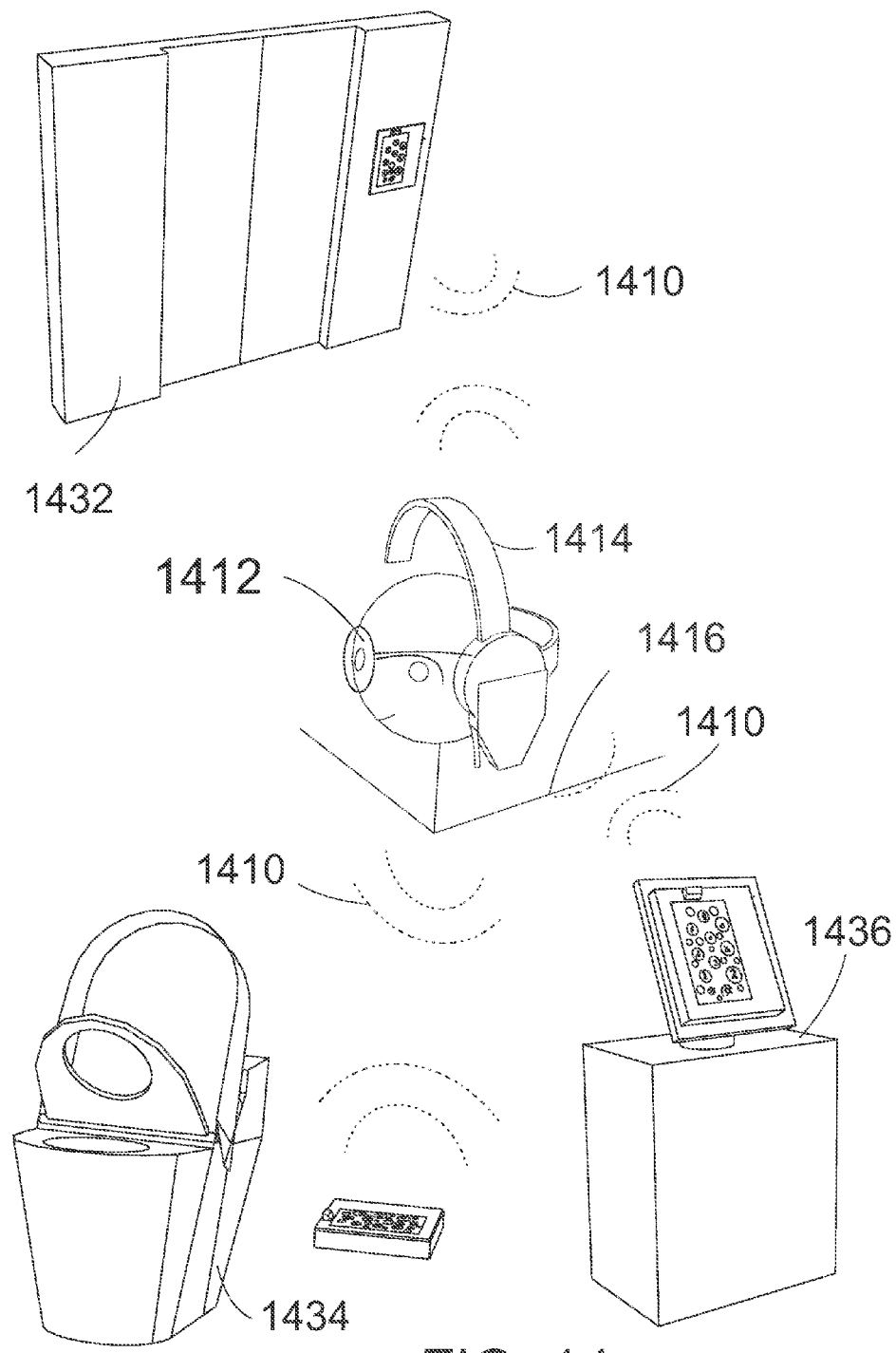
FIG. 14 illustrates a perspective view of a smart glasses and brainwave head set wirelessly connectable to other devices.

An Alternate Embodiment of a Portable Computer Operating a Device Description and Operation A Neurosky brain wave and thought monitoring headset 1414 shown in FIG. 14, can use thoughts to activate the device function icons. The head set can be connected to a Google glass smart eye glasses 1412. The headset and glasses can display the devices operating panel. The user can use thoughts, to activate a displayed icon. The activated icon, can operate a function of the device. The headset wirelessly signals the computer, to operate a displayed device function icon, displayed on the google glasses. The thoughts are associated, with displayed toilet device function icons. The thoughts are associated with certain brain waves; the certain brain waves, are associated with commands, for the displayed toilet devices. The user 1416 could also operate, a medical device 1436.

A user wearing the Neurosky headset on their head, can think elevator up, and the elevator 1432 up icon's luminosity will increase. The user thinks 'yes', the elevator up icon is activated, the elevator moves to pick up the user, going in the up direction.

The user can use the headset and the glass display together, to control the smart toilet's bidet devices 1434. The glasses can use eye tracking and eye gesture recognition, to operate the glasses external devices operating panel, displayed on the glasses. The glasses track the users, eye movements. The user's looks and the icon they want to activate. After a predetermined time of 1 second, the icon activates. The activated icon signal is sent to the device, to operate a function of the device.

Alternately the user can use brain thoughts, to create brain waves, such as, the user moves their tongue and the electrical brain signals associated with moving their tongue will increase the luminosity of the bidet 1434 front wash icon. The glasses and head set, connect to the devices, using radio wave 1410.

Two Differing Embodiments of a Touch Free Key Board Used for Avoiding the Transference of Bacteria while Trying Description One embodiment of the touch free keyboard display is a flexible display above transducers, which allows the display to flex, the flexing creates a mid-air touch filed above the display. The display can also have holes in the display, to allow transducers below the display, to send ultra-sonic energy through the display to create a haptic touch field above each displayed key, of the Elliptic labs ultrasonic mid-air gesture recognition sensors 2302, shown in FIG. 23. A User free air touch feedback which is produced, by ultra-sonic transducers 2308 above the keyboard, mid-air gesture recognition avatar and touch input display face. Ultra sonic transducers are also perpendicular, to the face of the keyboard display 2312, and ultra-sonic transducers are located below each key 2314.

Other three dimensional sensors 3D and cameras could be used, such as, an Intel Perceptual Computing Camera, Primesense camera, Kinect technology camera sensor, Haptix gesture recognition chip, Flutter gesture recognition system, elliptic labs ultrasonic sensor, a nano camera using light reflection from MIT school, to determine the location of a user's finger, and Samsung's Galaxy S4 infrared sensor, etc. A technology, called Chirp, which is made by Chirp Microsystems Company, uses ultra-sonic waves, can be used for touch free keyboard interaction.

The ultrasonic transducer array 2308, is around the Keyboard. The transducers are horizontal to the keyboard Key 2314, directing the sound waves over the screen. An Apple computer is connected to the gesture recognition camera 2302. The computer is connected, to the ultrasonic transducers. The computer is connected to a motor controller. A motor controller (not shown) is connected to the gesture recognition camera 2302. The motor controller connects to the ultrasonic transducers 2308. The computer connects to a visual signaling light source 2316. The computer connects to an audio signaling sound source (not show). The motor controller connects a visual signaling light source 2316. A visual gesture sign 2318 feedback sign 2316 show where the gesture 2322 and feedback 2306 areas begin.

The keyboard can be a touch free haptic mid-air QWERTY key board. The haptic feedback field starts about 3 centimeter from the key face. Each key may give an individual mid-air haptic feedback feel to a user's finger. Haptic feedback starts 2328 at around a 3 centimeter (cm) perpendicular distance, from a key face 2314. At around 1.5 cm distance 2330, from the key, the key may be activated. When the key 2314 is activated, it may give a haptic feel, such as, a click, etc. Each key can give a unique feel, when the key is activated.

Each Key is associated with a letter, symbol or number, as with a standard Keyboard. The key board keys 2314 can also be touched, pressed to activate the keys. The mid-air haptic and mid-air gesture recognition key board, could also be displayed on a touchscreen display. The ultra-sonic wave's travel at 45 kHz, from the transducers, directed perpendicular from the transducer 2308, arranged in a transducer array 2320, thru the keyboard face to a mid-air position perpendicular to the keyboard face. Transducers under each key 2310 direct mid-air haptic feel outward from the key. Transducers near the face of the keyboard 2312 direct mid-air haptic feel outward from the keyboard face.

The computer is programmed with transducer haptic feel creating software, which controls the ultrasonic transducers, turning on and off the power, regulating the power supplied to the transducers, which changes the feel of the haptic field. The computer can also be programmed with software, which runs the device it is attached too, or can communicate the users input with the display panel, to a computer which may run the device.

The computer is programmed with Pico's gesture recognition camera floating gesture recognition user detection software, floating ultrasonic field generating device software, computer operating software, computer operating system software and keyboard operating software. The motor controller is connected to an alternating or direct current power supply, and directs power to the keyboard components. The computer can direct the motor controller, to direct power to the keyboards components.

A sign 2316 showing the there is a mid-air activation zone activation zone, is viewable by a user. A sign 2318 showing the there is a mid-air haptic feedback zone, is viewable by a user.

A second embodiment uses a Liea mid-air display. The display uses a projected display onto floating water droplets, in FIG. 22. Transduces are located beneath each key, above the keys perpendicular to the display face (not shown), and ultra-sonic transducers are perpendicular the face of the keyboard display (not shown).

The Liea Display XL, connected to a computer, uses projector 2208 projections, on sprayed water droplets, laser projections, to create an interface display 2214. The display could also be used to create keyboard key mid-air holograms. The display can also represent the key icons 2236, in three dimensional space. A Pico Camboard mid-air gesture recognition camera 2202 is connected to a computer.

Figure 22:
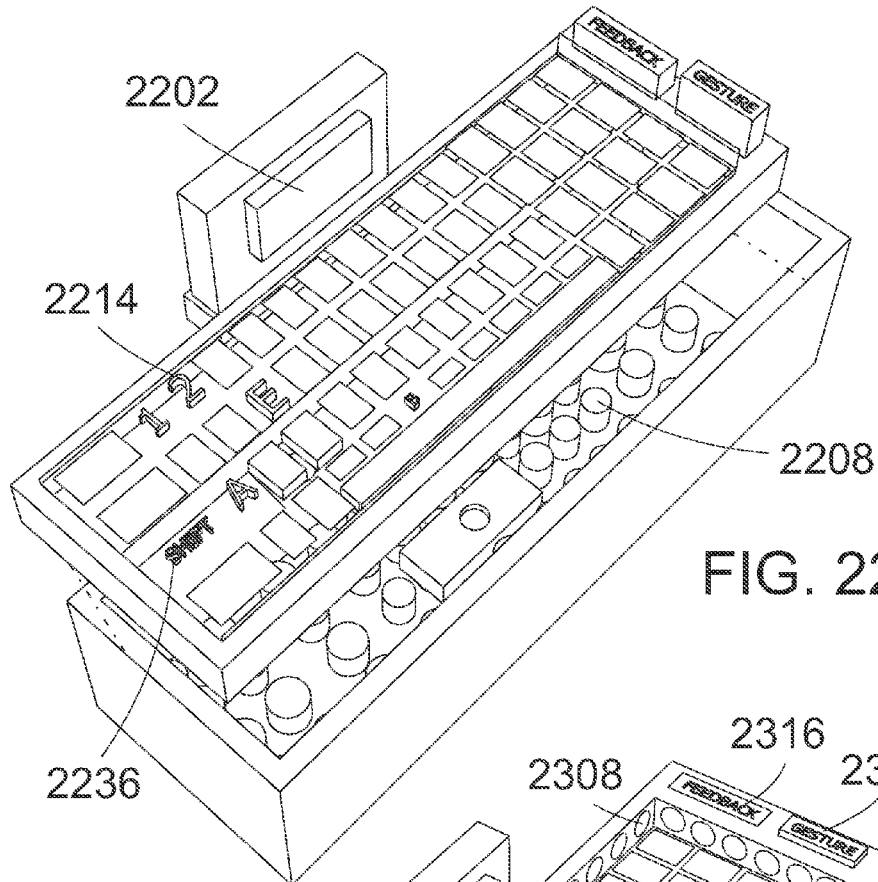
FIG. 22 shows a perspective view of a mid-air display keyboard.

In another embodiment the keyboard, can also be a projection, or laser projection, on to the transducer array, as shown in FIG. 22. The bottom projector is turned off, and the mid-air water droplet display is be turned off. A projector (not shown) above the transducers projects on to the transducers. The user mid-air touch inputs the keys, in mid-air above the keyboard projection. The mid-air gesture recognition sensor, detects the mid-air input of the keyboard keys. The user feels a unique, mid-air haptic feel for each key.

Two Differing Embodiments of a Touch Free Key Board Used for Avoiding the Transference of Bacteria while Trying Operation The user controls displayed avatars, with each fingertip. The fingertip avatars follow the user's finger tips movements, while they are moving in mid-air. The avatar can be a dot which moves, that the user can view, as the user moves their fingertips, around the keyboard, operating the keys.

Figure 23:
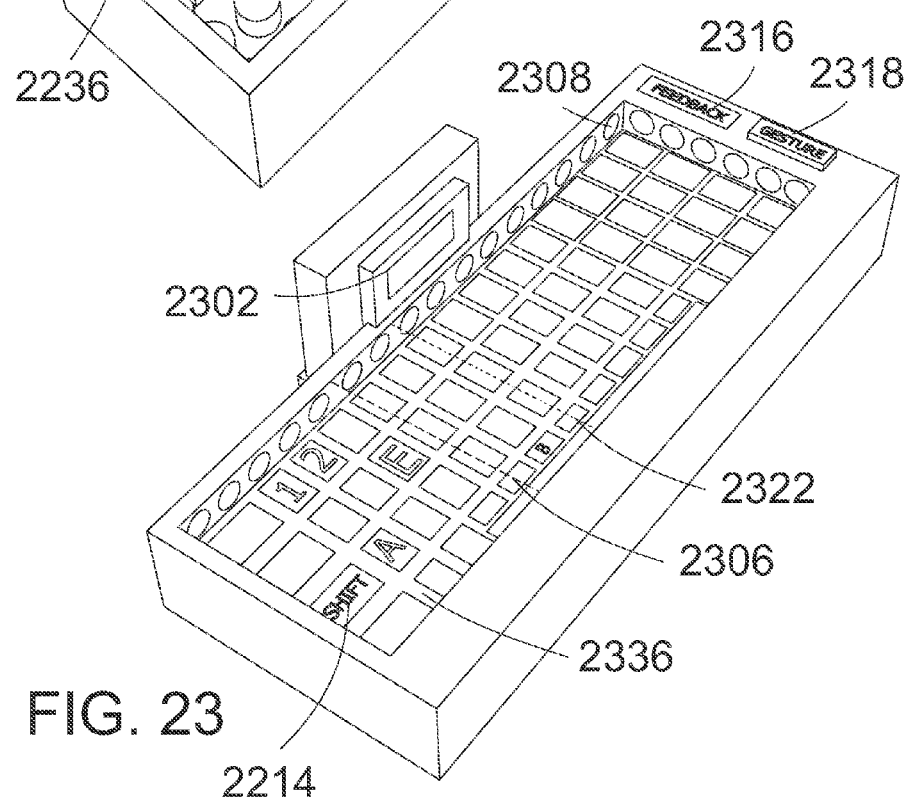
FIG. 23 shows a perspective view of a mid-air gesture keyboard display.

The elliptic labs ultrasonic gesture hand recognition sensors 2302, which could also be a Leap 3D sensor, XTR3D Cameras or 3d camera, detect when the user's finger touches, contacts the first user haptic feedback, zone, plane 2328, illustrated in FIG. 23. The sensors detects, when the user's finger touches, contacts the second user haptic feedback, zone, plane 2330 which is closer to the display screen, which is also the key activation plane. When the computer detects that the users finger, has contacted the activation plane 2330, the computer signals the motor controller, to send power to the transducers, to create a click feel on the users finger, Other feelings on the user's finger could be used, to signal that that the icon has been activated, such as, a buzz feeling, and a vibrating feel, etc.

The haptic feedback can be turned on continuously, for all the keys, or can be turned on, when the Pico camera senses the fingers, are in the gesture recognition zone 2206, and turned off when the finger leave the recognition zone. The feedback can also, be turned on and off for individual keys, when the users finger, is detected in the finger recognition area 2306.

The user touches and feels the key that they want to activate on the key board, as illustrated in FIG. 23. The user stops their forward finger movement, when they sense a change, in the air pressure above the key, of the floating haptic field, indicting the key has been activated. The user activates the key in mid-air. The user receives mid-air haptic feedback, while activating the keys.

The Elliptic sensors communicates with the computer, and sense's the uses hand gestures above the display 2306. The user activates the keyboards functions, by touching above the desired key 2314. The user moves their finger toward the key, until they receive visual 2316, audio and or floating haptic touch feedback 2630, indicating that the key 2314 has activated. The user can receive a click feel when they touch activate a key.

Utilizing a mid-air surface as the input, allows for application specific keyboards input devices to be implemented. For example, the surface may be utilized as an input device for gaming, providing game specific inputs. Moreover, when used as a keyboard, all keys are programmable, allowing for function keys, international keyboards, capitals, numeric, and so forth. Further, fewer keys may be provided in some embodiments and each key may be programmable for multiple functions (e.g., more than two functions per key).

Different feeling feedbacks, for different keys, can also be used, such as, a click touch, a hard touch, a texture, a medium touch, a soft touch, a oscillating touch, a buzzing touch, a wave touch etc. The user can activate different key, by feeling their unique touch, without having to visually view the desired key. The user can receive visual conformation that, the key has activated, such as, the key can change shape, the key can change color, etc. The user can receive audio feedback, that the key icon has activated, such as a click sound, a beep sound, etc. The user can receive touch feel conformation that, the key has activated, such as, a buzzing touch, a click touch, etc.

A user's typing speed may increase, due to less pressure needed to activate key. It might be easier to type, since individual keys can have a different feel, making the keys easy to recognize by feel. A user could operate the keyboard by using only touch, by remembering the positing of the floating button, and by the different feeling for each button. A unique audio sound can be used to identify each button.

A unique visual cue can be used to identify each key, such as, a change in color of the key, or a change in shape of the key.

The touch activation zone, the distance at which gestures, activate the floating buttons, can be set above the haptic field 2322, to have the haptic field act, as a distance identifier, from the key. The gesture activation zone 2306, can be set below, the haptic field outer range, from the key, to allow the field, to give a user the feeling of buttons, before activating the buttons, the buttons can then be activated by gesturing, closer to the screen, further within the haptic field.

The touch free keyboard may be beneficial, for users who don't want to touch surfaces, that other people have touched, or surfaces that might have bacterial or viruses on them. The keyboard could be used to reduce static electrical discharges caused by a user touching the keys 2314. Accordingly, a dynamic keyboard input device is provided.

Figure 17:
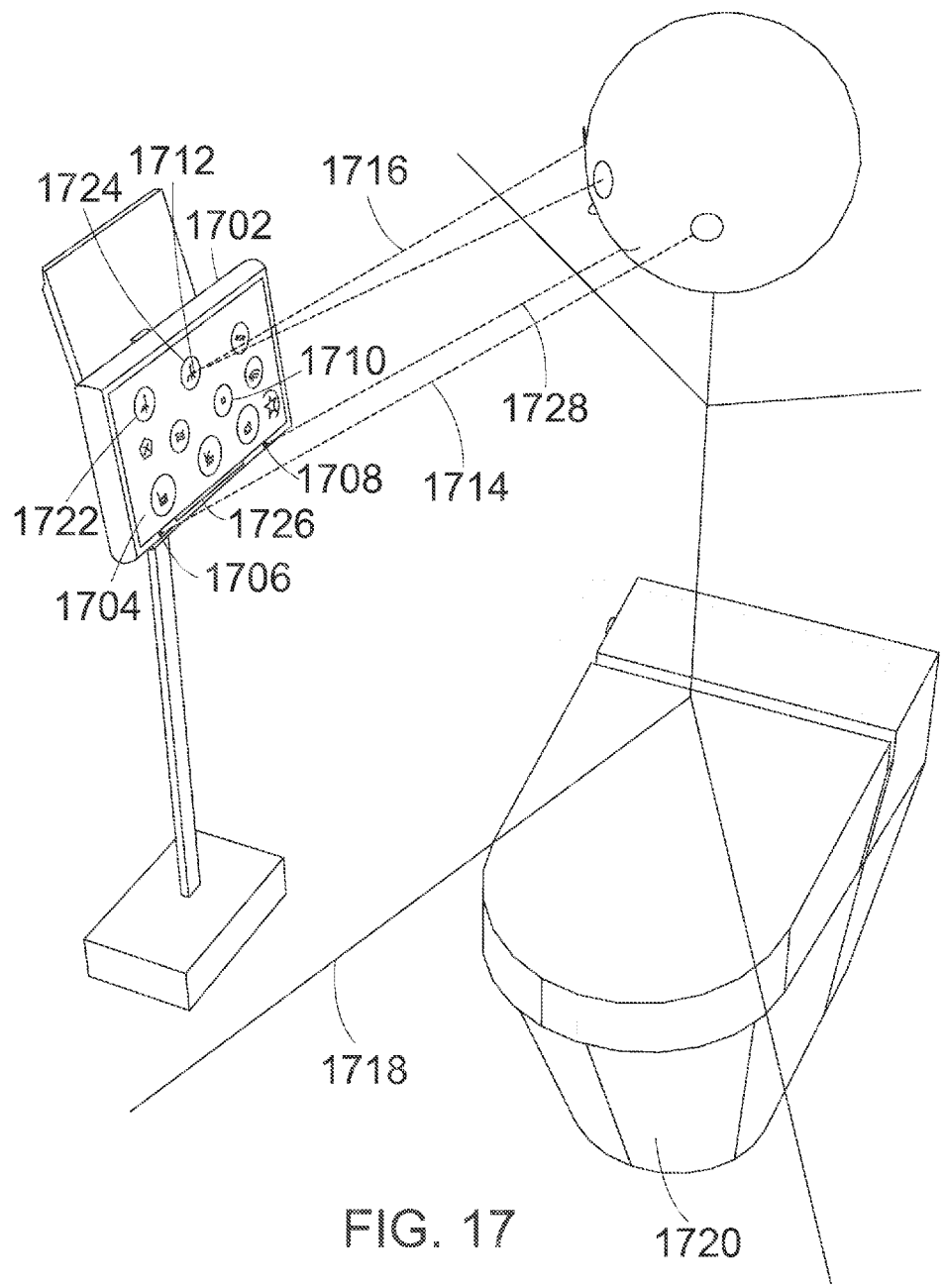
FIG. 17 shows a perspective view of a voice recognition and eye tracking input able smart toilet control panel.

Eye Tracking, and Voice Recognition, Used for Touch Free Input in to a Display Description The Tobii, eye tracker, eye tracking sensors 1726 made by the Tobii Technology Company, is attached to a display. The display is connected to a computer as shown in FIG. 17. Eyesight Company's eye input system could also be used. A microphone 1708 and speaker 1706 are part of the display 1702. The display screen 1726, displays menu icons 1722 of toilet 1720 functions of the various toilets devices 1720, such as, a bidet wand mover icon. Displayed devices may be a bidet front wash 1722, bidet back wash 1724, bidet water heater, bidet wand spray, water temperature control, water aeration, heated toilet seat, toilet seat and lid up and down positioning, bottom air dryer, internet connection, internet surfing, etc. The computer 1702 is programmed with Tobii eye tracking software 1702, Nuance voice recognition software 1702 and Kohler Numi smart toilet software 1702, and Microsoft operating system software 1702.

The user eye tracking interaction zone, the distance at which a user 1718 can interact, with the Tobii cameras 1726, which are installed in the display 1726, is from 20 centimeters to 2 meters. The distance which a user 1718 can interact, the user 1718 interaction zone 1728, with the Nuance voice recognition 1702 microphone 1708 is touch to about 3 meters. The computer 1702 connects to the internet using a WIFI 1702 connection. The computer 1702 can connect to the Satis 1720, by a Bluetooth 4.0 wireless connection, a WIFI network connection, or a wired connection (not show). The Satis toilet 1720 has an installed bidet 1720. The user 1718 can listen 1714 to, internet content from the computer speaker 1706, and view internet content on the display 1726.

Eye Tracking, and Voice Recognition, in a Combination Embodiment Operation

The microphone 1708 listens for a user's 1718 speech, vocalization of words, verbal communication, oral communication, spoken language shown in FIG. 17. The user 1718 vocally speaks 1728 the name of the displayed toilet device icon 1722 function; the icon 1722 is highlighted by the computer 1702. The user 1718 gives a verbal 1728 command, for the icon 1722 to be activated. The user says 1028 the 'yes" command, the icon 1722 is activated. The computer 1702 associates the chosen function, with Numi smart toilet 1720 instructions the computer 1702 sends the instructions to the toilet 1720, to supply a power to the chosen toilet component.

Tobii's eye tracker senses and signals the computer 1702, when the user is in the interaction range, of 20 centimeters 2 meters from the display face 1704, and the computer 1702 activates the system as shown in FIG. 17. The eye tracking sensors calibrate to a user's eyes after 3 seconds.

The eye movements 1716 control the movement, of the pointer, avatar or cursor 1712, on the display. The eyes acts as a mouse, controlling in synchronisation with the eyes, the movement of the pointer, on the screen. The user controls the cursor, and chooses toilet menu options, by positioning the pointer over the desired menu option on the display. A tool bar is displayed for operating the cursor. The tool bar has commands, such as, right click, left click, scroll, zoom, save, etc. The user move the cursor to an icon 606, then looks at the control bar double click option, which highlights. The user then looks back at the cursor, and the cursor double clicks the icon, as illustrated in FIG. 17.

For example the user's cursor 1712 is on the chosen toilet function icon 1724; the cursor 1712 is on the icon 1724. The cursor 1712 touches the icon; the user looks at the double click command, which highlights the double click command. The user looks back at the cursor on the icon and the icon is double clicked, and back wash icon 1724 is activated.

The user 1718 may use both, the Tobii Eye tracker 1726 and Nuance Voice Recognition 1708 together, to activate and deactivate the smart toilet devices 1720. A user may say 1728 front wash, the front wash icon 1722 is highlighted, the user 1718 says yes, the fount wash icon 1722 is activated, the users gaze 1712 moves the curs to the stop button, the stop button 1710 is activated and the, bidet 1720 is stopped. The cursor 1712 touches the back wash icon 1724; the user looks at the double click command, which highlights the double click command. The user looks back at the cursor on the icon and the icon is double clicked.

Figure 18:
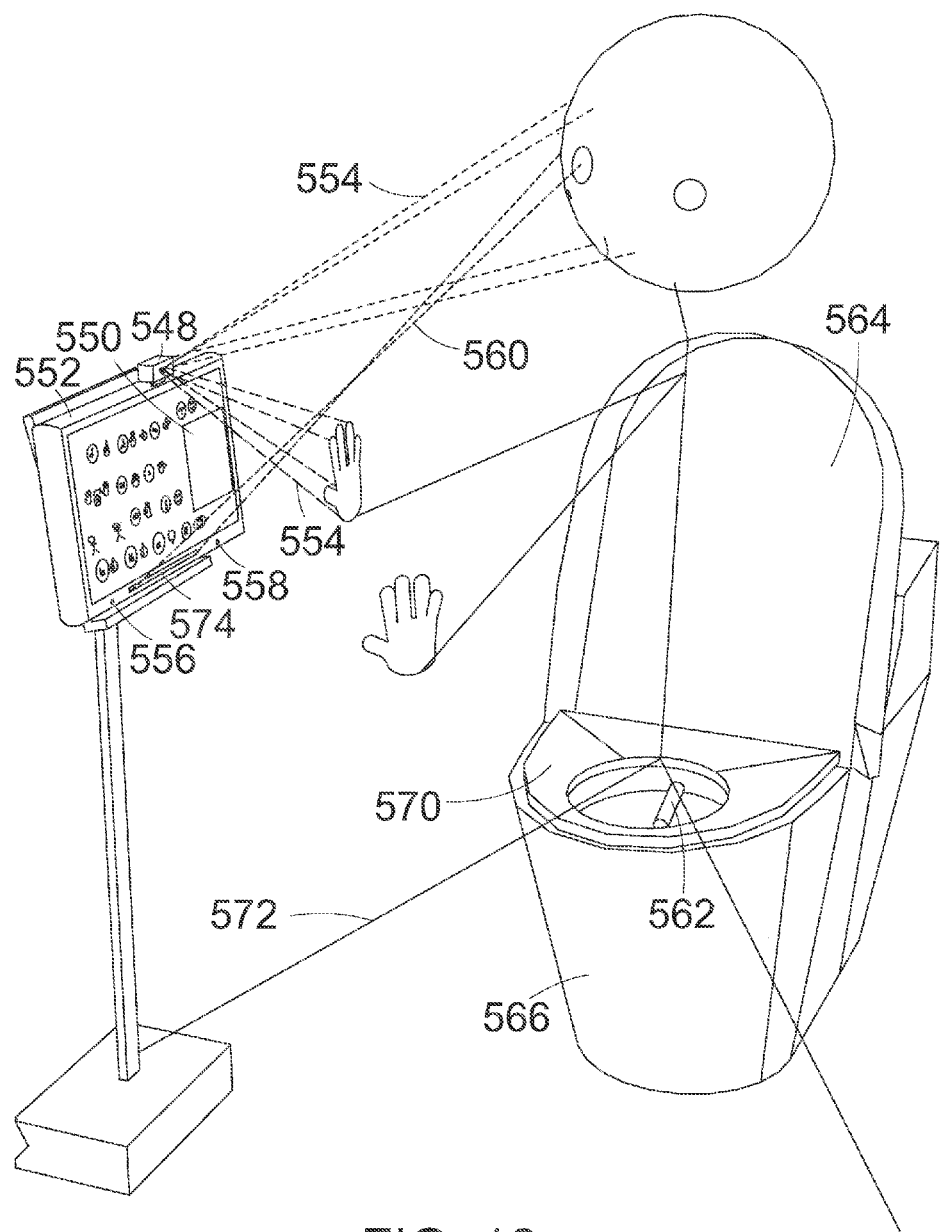
FIG. 18 shows a perspective view of a hand gesture recognition smart toilet control panel.
Figure 19:
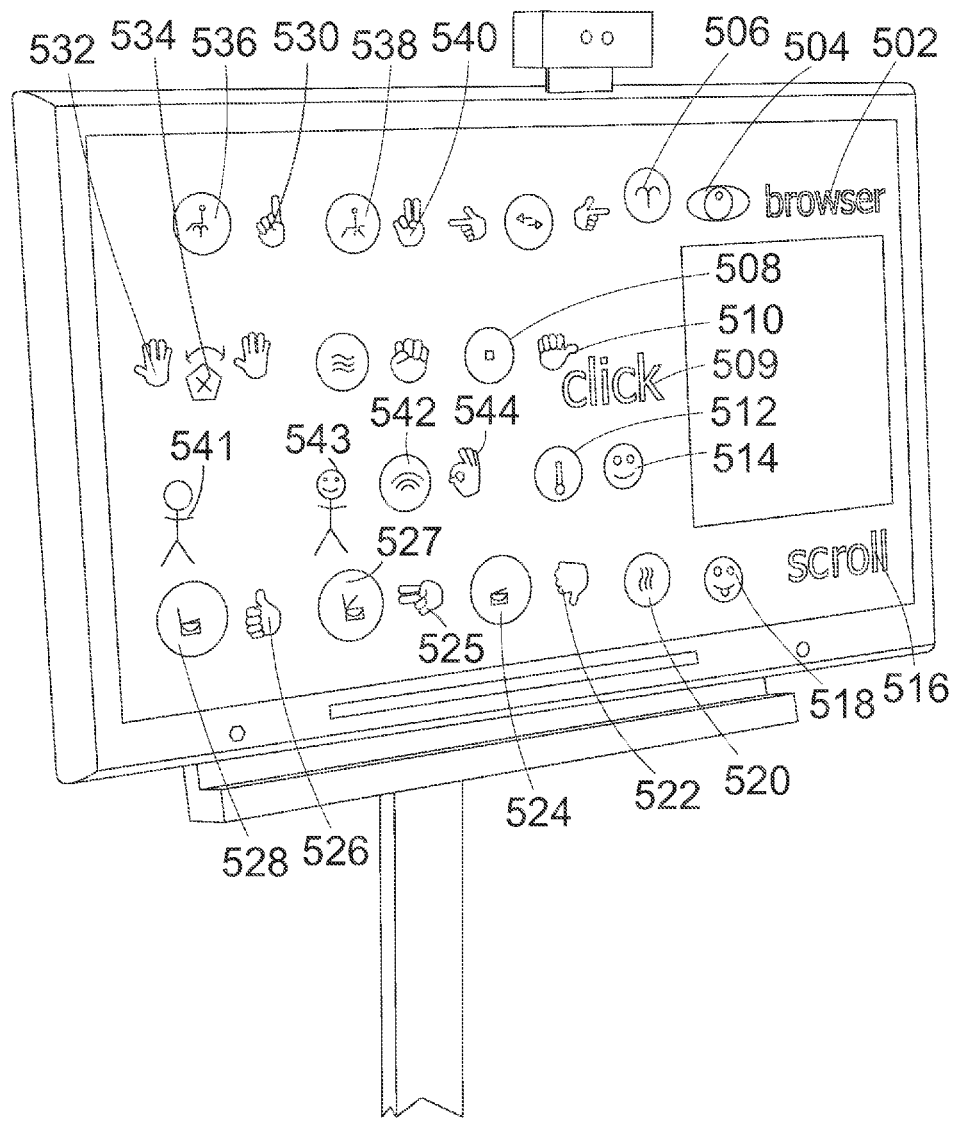
FIG. 19 shows a perspective view of a hand gesture recognition smart toilet control panel.

Body Gesture Recognition Used to Touch Freely Operate a Toilet to Avoid Contact with a Non Sterile Display Surface Description An all in one computer made by the Lenovo Company 552 has a microphone 556 and a speaker 558. In FIGS. 18 and 19. The computer 552 can be programmed with software from the Eyesight company of Israel, or programmed with Intel Technology realsense gesture recognition software, 552 made by the Intel company, An Intel Perpetual computing software developer's kit SDK, or Microsoft Kinect for windows software, can be used to create the software for the hand, body, facial, and tongue gesture recognition software, recognition software, etc. The computer is programmed with Satis toilet operating software 552. The computer 552 is programmed with Windows 8 operating software 552.

The camera can be an Intel realsense camera sensor 548 or a Microsoft Kinect for windows camera sensor. A user gesture interaction zone 554, extends from around 20 centimeters to about 1 meter, from the front of the Intel camera 548. The computer 552 is connected to the camera 548 by wire; the camera 548 faces the bathroom user area. The computer 552 is connected to the smart toilet 566, by wire using a wire or wireless WIFI connection. The computer 552 can connect to the internet, using a wired or wireless WIFI connection. The display 550 can show internet TV. The computer 552 has a memory for data storage. The menu of pictograph gesture prompts 550, can be shown on the display screen 550, or on printed panel display pictographs (not shown). The Tobii, eye tracker and eye tracking sensors 574, are attached to the computer 552. The computer 552 is programmed, with Tobii eye tracking software 552. The computer has a microphone 556, and a speaker 558.

Body Gesture Recognition Used to Touch Freely Operate a Toilet to Avoid Contact with a Non Sterile Display Surface Operation In FIGS. 18 and 19, a user 572 views the displayed 550 hand gestures, and body part gestures, that are associated with various toilet device functions. The user 572 chooses a toilet device function, and preforms the hand gesture or body gesture, associated with the toilet function within view of the camera 548. The user 572 shows their body part gestures and hand gestures, within view of the camera 548. The camera 548 sends the viewed hand gesture images to the computer 552. The computer 552 is programmed with, hand gesture recognition software. The computer associates the gesture received, from the camera, with stored gestures information. The stored gestures may be associated, with instructions or requests, for the activation of the device. The instructions are sent to the toilet. The toilet activates and deactivates, the chosen toilet devices functions. When the toilet function is chosen, the chosen gesture icon is highlighted. The icon highlight turns off, when the device deactivates.

The internet can be activated, using the internet activation gesture. For example the user wants to activate the front wash bidet, the user gives a thumbs up gesture to raise the lid, the lid up icon illuminates, when the lid reaches the up position the lid icon turns off, while seated on the toilet the user gives a finger up to activate the front wash. The front wash icon illuminates. The bidet cycles through a front wash cycle. The front wash icon illuminates. The user can add gestures to, and change the association of gestures with the toilet devices. To change associated gestures and devices, the user can access, the change the gesture associations edit menu, by gesture activating the edit button (not shown).

The user activates the bottom air dryer 520, by following the stick out tongue icon 518, and sticking out their tongue within view of the camera 548. The user activates the toilet seat heater 512 by following the smiley face icon 518, and smiling 572 in view of the camera 548. The user activates the stop button 508, by following the hand in a first with thumb sticking out icon 510, and gesturing a hand in a first with thumb sticking out 572 in view of the camera 548. The user activates the front wash bidet icon 536, by following the one finger up icon 530, and raising one finger up 572 in view of the camera 548. Activating the front wash bidet icon 536, activates the front wash bidet 562.

The user activates the back wash bidet icon 538, by following the two fingers up icon 540, and raising two fingers up 572, in view of the camera 548. The user can activate the increase or decrease bidet water spray pressure icon 506, by following the associated eye looking up icon 504, and looking up to increased spray water pressure, or looking down to decrease spray water pressure in view of the eye tracker 574, in the eye interface zone 560. The user 572 activates the lid up icon 528, by following the first with thumb up icon 526, and making a first with thumb up, in view of the camera 548. The user 572 activates the seat up icon 527, by following the two fingers pointed out horizontally icon 525, and making the two fingers pointed out horizontally gesture in view of the camera 548. The user 572 can lower the seat 570, by repeating the thumbs down hand gesture (not numbered). The lid down icon 524, is associated with first with thumb down icon 522.

The user 572 activates the back body profile gesture, associated with putting the lid in the up position, with the seat in the down position icon 528, by following the user show back to camera icon 541, and the user showing their back body profile, to the camera 548. The user activates the front body profile gesture, associated with putting the lid in the up position with the seat in the down position icon 527, by following the user show front to camera icon 543, and the user showing their front body profile to camera 548. The computer identifies a user's front by identifying that the user's face is facing the camera, or identifying that the user's eyes are facing the eye tracker 574. The computer identifies the user's 574 back by identifying that the user's face is not facing the camera 548, or identifying that the eyes are not facing the eye tracker 574.

The user activates the internet connection, which is displayed on an area of the computer display 550, by following the three fingers up with thumb and index finger making a circle hand sign icon 544, which is associated with the internet activation icon 542, and making the fingers up with thumb and index finger making a circle hand sign, within view of the camera 548. When the user activates the internet, body gestures can be used to control internet browsing. Words can be displayed which, are associated with body gestures. The internet content can be viewed, on an area of the display, sharing the display with the gesture icons, or a, browser page can fill the whole display screen (not shown)

A larger menu, with more illuminated internet commands of associated gesture icons, can be accessed by the user, by following the move eye up or down icon 504, associated with the illuminated browser 502, by looking up within view of the eye tracker 574, while in internet connection mode. The user can click on the location where the pointer is, by following the first with thumb sticking out icons 510, associated with the illuminated click 509.

The user 572 can scroll up or down on a displayed web page, or document by following the extend out tongue icon 514, associated with the illuminated scroll lettering 516, and extending their tongue out and down to Scholl down, or extending their tongue up and out to scroll up in view of the camera.

The user can activate the seat following icon 534, by following the hand back and forth movement icon 532, and moving their hand up and down with in view of the camera 548, the seat will move in synchronization with the closest user hand to the camera. If the user 572 movers their hand within view of the camera 548, the seat 570 will move up and vice versa. If the user stops moving their hand, the seat 570 will stop moving and stay in place, which could be in a middle position between up or down position, until the user continues moving their hand. When the seat 570 or lid 564 reaches the up or down position, the seat 570 or lid 564 will stay in place until the seat 570 or lid 564 following button (not shown) is activated.

The hand gestures associated with toilet functions activation can be used for to controlling internet browsing, and TV viewing, they can be switched for internet and TV use, the circle with three fingers up gesture, actives the internet connecting browsing mode. An internet browser web page appears. Using a thumbs up or thumbs down, a user 574 can scroll one webpage up or down; pages can be moved forward and back by moving their hand back and forth in front of the screen 550. A cursor (not shown) can be controlled, by the pointing the fingers in the desired direction of the curser movement. The cursor movement speed in controlled, by the opening and closing of the user's fingers. The cursor doesn't move, when the fingers are closed, the cursor moves when the fingers open, the more the fingers open the faster the curser moves. For example the user points their right hand, diagonally up to the left and opens their finger, the cursor moves up and to the left on the display screen, this works for both left and right hands. The user closes their fingers when the cursor has reached the desired location. The user closes their hand to click. When the cursor is at on the desired cursor location, the user opens and closes their hand, twice to double click the cursor.

The user can access a virtual keyboard (not shown), using the cursor and enter letters and numbers, using the cursor. A user can program their own gestures, to be associated with device function operations. The user can change the gestures that are associated with toilet functions. Sign language hand gestures, could be programmed in to the system.

The touch free user body gesture recognition input device means, is the Intel perceptual computing camera sensor 548, Intel perceptual computing gesture recognition software 552, the Tobii eye tracker eye tracking sensors 574, Tobii eye tracking software, Microsoft operating system software, and Satis toilet application software.

CONCLUSIONS, RAMIFICATIONS AND SCOPE

CONCLUSION: From the preceding description and drawings it becomes apparent that a user, can touch freely interact with the display to operate a device. The touch free panel control assembly used to operate a device. may be beneficial, to avoid igniting combustibles in the air, such as, dust particles in grain silos, flammable petroleum vapours, in oil refineries, and paint factory flammable vapors in the air, etc. Other devices touch free input may include, piano keys, guitar strings, hospital bed control panels, public computer terminals that use a keyboard, such as, library Keyboards, airplane toilet control panels, payphone input displays, hotel TV remote controls, hotel door lock input panels, cellphones, tablet computers, shared workplace keyboards, and gym athletic equipment interactive display screens, etc. A MisTable three dimensional screen, which allows users to push images and objects on the screen, around with their hands, made by the University of Bristol in England, could be used. Users can interact with each other, using mid-air touch feel devices. Users can feel objects and other user's avatars in mid-air, using avatars in virtual worlds and computer games. The advantages of the touch free display connected to a device, without limitation, are an improved hygienic way to operate a device.

Although the description above contains much specificity, these should not be construed as limiting the scope of the embodiments, but as merely providing illustrations, of some of the presently preferred embodiments.

Thus the scope of the embodiments should be determined by the appended claims and their legal equivalents rather than by the examples given. Thus the reader will see that at least one embodiment, of the touch free panel control assembly used to operate a device, provides a more reliable, healthier and economical device that can be used by persons of almost any age. It will be apparent that various changes and modifications can be made without departing from the scope of the various embodiments as defined in the claims. Although the embodiments have been described in connection with various embodiments, it should be understood that various modifications, additions and alteration may be made to the embodiment by one skilled in the art without departing from the spirit and scope of the embodiments as defined in the appended claims.

The foregoing describes some example embodiments, of systems and methods, for providing and configuring the touch free panel control assembly, which is used to operate a device. Although the foregoing discussion has presented specific embodiments, persons in the field will recognize, that changes may be made in form and detail, without departing from the spirit and scope of the embodiments. Accordingly, the specific embodiments described herein should be understood as examples, and not limiting the scope thereof.

I claim:

1. A device having a sanitary input display comprising,
   a) a computer having a processor, having a non-transitory storage medium, and having a computer software configured to operate the device,
   b) a display having a connection to the computer,
   for the out putting of displayed data which is representative of operating functions of a device,
   c) input able data displayed on the display,
   d) the input able data associated with the operation of the device,
   for allowing the displayed data to be referenced by a user for non-touch user input operation of the device,
   e) a non-touch input device having a connection to the computer,
   for allowing a user non-touch input at least one of the displayed device operation data, into the computer,
   for the non-touch input to be associated with input of at least one of the displayed device operation data,
   for the input of the displayed device operation data to activate a computer function,
   f) the device connected to the computer,
   for the activated computer function to operate the device,
   whereby the user may operate the device, clear of possible bacterial transmission, by using the non-touch input device, and display,
   wherein the device is a flammable environment operating device, for allowing static free touch input, for the static free touch input to reduce the possibility of ignition of flammable environment vapors,
   wherein the flammable environment operating device is a gas compressor; and
   the non-touch input device is an eye tracking input device for allowing the user to input using eye movements.

2. The device having a sanitary input display of claim 1, wherein the non-touch input device further comprises a mid-air gesture input device for allowing the user to input using mid-air gestures.

3. The device having a sanitary input display of claim 1, wherein the non-touch input device further comprises a voice recognition input device for allowing the user to input using vocalization.

4. The device having a sanitary input display of claim 1, wherein the non-touch input is used to highlight and activate icons displayed on the sanitary input display.

5. The device having a sanitary input display of claim 1, wherein the non-touch input is used to reduce static electricity in the flammable environment.

6. The device having a sanitary input display of claim 1, wherein the flammable environment is a gas station gas pump.

7. The device having a sanitary input display of claim 1, wherein the flammable environment is an oil refinery.

8. The device having a sanitary input display of claim 1, wherein the flammable environment is a grain silo with airborne dust particles.

\* \* \* \* \*